(12) United States Patent
Spitzer et al.

(10) Patent No.: US 8,897,524 B2
(45) Date of Patent: Nov. 25, 2014

(54) METHOD AND DEVICE FOR PROCESSING COMPUTERIZED TOMOGRAPHY IMAGES

(75) Inventors: Hedva Spitzer, Tel Aviv (IL); Hadar Cohen-Duwek, Tel-Aviv (IL); Yuval Barkan, Kfar-Sirkin (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 932 days.

(21) Appl. No.: 12/740,351

(22) PCT Filed: Oct. 29, 2008

(86) PCT No.: PCT/IL2008/001419
§ 371 (c)(1),
(2), (4) Date: Apr. 29, 2010

(87) PCT Pub. No.: WO2009/057106
PCT Pub. Date: May 7, 2009

(65) Prior Publication Data
US 2010/0260401 A1 Oct. 14, 2010

Related U.S. Application Data

(60) Provisional application No. 61/000,735, filed on Oct. 29, 2007, provisional application No. 61/193,065, filed on Oct. 27, 2008.

(51) Int. Cl.
*G06K 9/00* (2006.01)
*G06T 11/00* (2006.01)
*G06T 5/40* (2006.01)
*G06T 5/00* (2006.01)

(52) U.S. Cl.
CPC ......... *G06T 5/40* (2013.01); *G06T 2207/30061* (2013.01); *G06T 11/008* (2013.01); *G06T 2207/30004* (2013.01); *G06T 2207/30041* (2013.01); *G06T 5/008* (2013.01); *G06T 2207/20012* (2013.01); *G06T 2207/10081* (2013.01)
USPC ......................................................... 382/131

(58) Field of Classification Search
None
See application file for complete search history.

(56) References Cited

U.S. PATENT DOCUMENTS

| 4,384,336 A | 5/1983 | Frankle et al. |
| 5,012,333 A | 4/1991 | Lee et al. |
| 5,042,077 A * | 8/1991 | Burke ........................... 382/169 |

(Continued)

FOREIGN PATENT DOCUMENTS

| EP | 0901671 | 9/2003 |
| WO | WO 95/33306 | 12/1995 |

(Continued)

OTHER PUBLICATIONS

Greenleaf, James F. et al., "Selected Methods for Imaging Elastic Properties of Biological Tissues", Annu. Rev. Biomed. Eng., 5:57-78, 2003.*

(Continued)

*Primary Examiner* — Robert Morgan
*Assistant Examiner* — Michael Tomaszewski

(57) ABSTRACT

A method of processing a computerized tomography image is disclosed. The method comprises preprocessing the image using contrast enhancement weight function, thereby providing a preprocessed image having a first dynamic range; and applying a companding procedure to the preprocessed image, so as to reduce the first dynamic range.

24 Claims, 40 Drawing Sheets
(16 of 40 Drawing Sheet(s) Filed in Color)

(56) References Cited

U.S. PATENT DOCUMENTS

| | | | |
|---|---|---|---|
| 5,343,254 A | | 8/1994 | Wada et al. |
| 5,717,791 A | * | 2/1998 | Labaere et al. ............... 382/274 |
| 5,991,456 A | * | 11/1999 | Rahman et al. ............... 382/254 |
| 6,122,012 A | | 9/2000 | Segman |
| 6,211,515 B1 | | 4/2001 | Chen et al. |
| 6,212,304 B1 | | 4/2001 | Durg et al. |
| 6,609,135 B1 | * | 8/2003 | Omori et al. ......................... 1/1 |
| 6,674,544 B2 | | 1/2004 | Shiota et al. |
| 6,717,698 B1 | | 4/2004 | Lee |
| 6,724,435 B2 | | 4/2004 | Segman |
| 6,779,040 B1 | | 8/2004 | Lee et al. |
| 6,788,822 B1 | | 9/2004 | Zhang et al. |
| 6,829,384 B2 | | 12/2004 | Schneiderman et al. |
| 6,912,307 B2 | * | 6/2005 | Spitzer et al. ................. 382/167 |
| 6,931,152 B2 | * | 8/2005 | Spitzer ........................... 382/167 |
| 6,947,176 B1 | | 9/2005 | Kubo et al. |
| 7,142,704 B2 | * | 11/2006 | Hara .............................. 382/131 |
| 7,260,266 B2 | | 8/2007 | Nakajima et al. |
| 7,489,814 B2 | * | 2/2009 | Spitzer et al. ................. 382/167 |
| 7,620,265 B1 | | 11/2009 | Wolff et al. |
| 7,893,974 B2 | | 2/2011 | Chiba |
| 8,131,109 B2 | * | 3/2012 | Kim et al. ...................... 382/274 |
| 8,320,996 B2 | | 11/2012 | Panasyuk et al. |
| 2001/0041004 A1 | | 11/2001 | Shefer |
| 2002/0154323 A1 | | 10/2002 | Sobol et al. |
| 2002/0159627 A1 | | 10/2002 | Schneiderman et al. |
| 2003/0026494 A1 | | 2/2003 | Woodell et al. |
| 2003/0123719 A1 | * | 7/2003 | Kurahashi ...................... 382/131 |
| 2004/0066850 A1 | | 4/2004 | Nakajima et al. |
| 2004/0091164 A1 | | 5/2004 | Sakatani et al. |
| 2004/0136600 A1 | | 7/2004 | Yfantis |
| 2004/0165086 A1 | | 8/2004 | Spitzer et al. |
| 2005/0089240 A1 | | 4/2005 | Gallagher et al. |
| 2006/0013478 A1 | | 1/2006 | Ito et al. |
| 2006/0098897 A1 | | 5/2006 | Dewaele |
| 2006/0119713 A1 | | 6/2006 | Deguchi et al. |
| 2006/0247514 A1 | | 11/2006 | Panasyuk et al. |
| 2007/0071350 A1 | | 3/2007 | Lee et al. |
| 2007/0076127 A1 | | 4/2007 | Abe et al. |
| 2007/0269095 A1 | | 11/2007 | Couwenhoven et al. |
| 2008/0031538 A1 | | 2/2008 | Jiang et al. |
| 2009/0169102 A1 | | 7/2009 | Zhang et al. |
| 2009/0303345 A1 | | 12/2009 | Deguchi et al. |
| 2010/0183071 A1 | | 7/2010 | Segall et al. |
| 2011/0001842 A1 | * | 1/2011 | Spitzer et al. ............... 348/223.1 |
| 2012/0201456 A1 | * | 8/2012 | El-Mahdy et al. ............ 382/167 |
| 2012/0257808 A1 | * | 10/2012 | Spitzer et al. ................. 382/131 |
| 2013/0011029 A1 | * | 1/2013 | Ron et al. ...................... 382/128 |
| 2013/0148908 A1 | | 6/2013 | Barkan et al. |

FOREIGN PATENT DOCUMENTS

| | | |
|---|---|---|
| WO | WO 2004/075535 | 9/2004 |
| WO | WO 2009/057106 | 5/2009 |
| WO | WO 2009/081394 | 7/2009 |
| WO | WO 2012/017440 | 2/2012 |

OTHER PUBLICATIONS

Chaturvedi, Pawan et al., "2-D Companding for Noise Reduction in Strain Imaging", IEEE Transactions on Ultrasonics, Ferroelectrics, and Frequency Control, vol. 45, No. 1, Jan. 1998.*
Communication Pursuant to Article 96(2) EPC Dated Apr. 6, 2006 From the European Patent Office Re.: Application No. 04712652.9.
Official Action Dated May 29, 2008 From the U.S. Appl. No. 10/369,671.
Communication Pursuant to Article 94(3) EPC Dated May 25, 2009 From the European Patent Office Re.: Application No. 04712652.9.
International Search Report and the Written Opinion Dated Nov. 15, 2011 From the International Searching Authority Re. Application No. PCT/IL2011/000639.
Notice of Allowance Dated Oct. 31, 2008 From the U.S. Appl. No. 10/369,671.
Barkan et al. "Brightness Contrast-Contrast Induction Model Predicts Assimilation and Inverted Assimilation Effects", Journal of Vision, XP002659387, 8(7): 1-26, Oct. 17, 2008.
Creutzfeldt et al. "The Neurophysiological Correlates of Colour and Brightness Contrast in Lateral Geniculate Neurons. II. Adaption and Surround Effects", Experimental Brain Research, 87: 22-45, 1991.
Creutzfeldt et al. "The Neurophysiological Correlates of Colour and Brightness Contrast6 in Lateral Geniculate Neurons. I. Population Analysis", Experimental Brain Research, 87: 3-21, 1991.
Farbman et al. "Edge-Preserving Decompositions for Multi-Scale Tone and Detail Manipulation", ACM Transactions on Graphics, XP055011074, 27(3/Art.67): 67-1-67-10, Aug. 2008. Section 6.1.
Fattal et al. "Gradient Domain High Dynamic Range Compression", Proceedings of the ACM Siggraph, p. 249-256, 2002.
Fattal et al. "Multiscale Shape and Detail Enhancement From Multi-Light Image Collections", ACM Transactions on Graphics, XP055011081, 26(3/Art.51): 51-1-51-9, Jul. 29, 2007. Sections 3-5, Fig.2.
Jobson et al. "A Multiscale Retinex for Bridging the Gap Between Color Images and the Human Observation of Scenes", IEEE Transactions on Image Processing, 6(7): 965-976, 1997.
Li et al. "Compressing and Companding High Dynamic Range Images With Subband Architectures", Proceedings of ACM Siggraph 2005, ACM Transactions on Graphics, XP003010843, 24(3): 836-844, Jul. 2005.
Mead "Analog VLSI and Neural Systems", Table of Contents, Addison-Wesley, XV-XXII, 1989.
Naka et al. "S-Potentials From Colour Units in the Retina of Fish (Cyprinidae)", Journal of Physiology, 185: 536-555, 1966.
Norman et al. "Cone Photoreceptor Physiology and Cone Contributions to Colour Vision", The Perception of Colour, p. 146-162, 1991.
Pattanaik et al. "Adaptive Gain Control for High Dynamic Range Image Display", Proceedings of Spring Conference in Computer Graphics (SCCG2002), Budmerice, Slovakia, 7 P., 2002.
Rahman et al. "A Multiscale Retinex for Color Rendition and Dynamic Range Compression", SPIE International Symposium on Optical Science, Engineering, and Instrumentation, Applications of Digital Image Processing XIV, 2825: 9 P., 1996.
Spitzer et al. "Biological Gain Control for High Dynamic Range Compression", Final Program and Proceedings of the IS & T & SID—11th Color Imaging Conference: Color Science and Engineering: Systems, Technologies, Applications, p. 42-50, 2003.
Spitzer et al. "Color Constancy: A Biological Model and Its Application for Still and Video Images", Pattern Recognition, 35(8): 1645-1659, 2002. Abstract, Sec.2: Model From p. 1646-1649, Sec.4.4: Video Sequences, p. 1656-1658, Fig. 1.
Toet Adaptive Multi-Scale Contrast Enhencement Through Non-Linear Pyramid Recombination, Pattern Recognition Letters, XP000168635, 11(11): 735-742, Nov. 1, 1990. Abstract, Sections 2-3.
Wyszecki et al. "Color Science Concepts and Methods, Quantitative Data and Formulae", Wiley & Sons, 2000. Short Description. p. 156-166.
International Preliminary Report on Patentability Dated Jul. 1, 2010 From the International Bureau of WIPO Re. Application No. PCT/IL2008/001623.
International Search Report Dated Apr. 9, 2009 From the International Searching Authority Re.: Application No. PCT/IL2008/001623.
Written Opinion Dated Apr. 9, 2009 From the International Searching Authority Re.: Application No. PCT/IL2008/001623.
Communication Pursuant to Article 94(3) EPC Dated Dec. 1, 2011 From the European Patent Office Re.: Application No. 04712652.9.
Official Action Dated Oct. 16, 2012 From the U.S. Appl. No. 12/808,731.
Corrected International Search Report and the Written Opinion Dated Dec. 27, 2011 From the International Searching Authority Re. Application No. PCT/IL2011/000639.
Burt et al. "The Laplacian Pyramid as a Compact Image Code", IEEE Transactions on Communications, Com-31(4): 532-540, Apr. 1983.
Rizzi et al. "A Modified Algorithm for Perceived Contrast Measure in Digital Images", 4th European Conference on Graphics, Imaging and Vision, 10th International Sympsoium on Multispectral Color Sci-

(56) References Cited

OTHER PUBLICATIONS ence: CGIV/MCS'08, Jun. 9-13, 2008, Barcelona, Espana, Final Program and Proceedings, p. 249-252, 2008.
International Preliminary Report on Patentability Dated Feb. 14, 2013 From the International Bureau of WIPO Re. Application No. PCT/IL2011/000639.
International Preliminary Report on Patentability Dated May 14, 2010 From the International Bureau of WIPO Re.: Application No. PCT/IL2008/001419.
International Search Report Dated Feb. 3, 2009 From the International Searching Authority Re.: Application No. PCT/IL2008/001419.
Written Opinion Dated Feb. 3, 2009 From the International Searching Authority Re.: Application No. PCT/IL2008/001419.
Bae et al. "Aortic and Hepatic Contrast Medium Enhancement at CT. Part I. Prediction With a Computer Model", Radiology, 207: 647-655, 1998.
Barnes "Characteristics and Control of Contrast in CT", RadioGraphics, 12: 825-837, 1992.
Bartz et al. "Volumetric High Dynamic Range Windowing for Better Data Representation", Proceedings of the 4th International Conference on Computer Graphics, Virtual Reality, Visualization and Interaction in Africa, Cape Town, South Africa, Afrigraph, p. 137-144, Jan. 25-27, 2006.
Chang et al. "Image Contrast Enhancement Based on a Histogram Transformation of Local Standard Deviation", IEEE Transcation on Medical Imaging, 17(4): 518-531, Aug. 1998.
Cromartie et al. "Edge-Affected Context for Adaptive Contrast Enhancement", Proceedings of the XIIth International Meeting on Information Processing in Medical imaging: Lecture Notes in Computer Science, p. 474-485, 1991.
Duan et al. "Comprehensive Fast Tone Mapping for High Dynamic Range Image Visualization", Proceedings of Pacific Graphics, p. 1-9, 2005.
D'Zmura et al. "Contrast Gain Control", Color Vision: From Genes to Perception, Chap.19: 369-385, 1999.
Fayad et al. "Chest CT Window Settings With Multiscale Adaptive Histogram Equalization: Pilot Study", Radiology, 223: 845-852, 2002.
Hara et al. "Generalized Dynamic Range Compresiion Algorithm for Visualization of Chest CT Images", Medical Imaging 2004: Visualization, Image-Guided Procedures, and Display, Proceedings of the SPIE, 5367: 578-585, 2004.
Ji et al. "Adaptive Image Contrast Enhancement Based on Human Visual Properties", IEEE Transactions on Medical Imgaing, 13(4): 573-568, Dec. 1994.
Jin et al. "Contrast Enhancement by Multi-Scale Adaptive Histogram Equalization", SPIE Proceedings Series, 4478: 206-213, 2001.
John et al. "Performance of a Single Lookup Table (LUT) for Displaying Chest CT Images", Academic Radiology, 11: 609-616, 2004.
Lehr et al. "Body Computed Tomography: Histogram Equalization of CT Images", Radiology, 154: 163-169, 1985.
Lerman et al. "Contrast Enhancement of Soft Tissues in Computed Tomography Images", Medical Imaging 2006: Image Processing, Proceedings of the SPIE, 6144: 2103-2110, 2006.
Li et al. "Compressing and Companding High Dynamic Range Images With Subband Architectures", ACM Transactions on Graphics, Proceedings of ACM Siggraph, 24(3): 836-844, 2005.
Olzak et al. "Multiple Gain Control Processes in Contrast-Contrast Phenomena", Vision Research, 39: 3983-3987, 1999.
Pizer et al. "Adaptive Histogram Equalization and Its Variations", Computer Vision, Graphics, and Image Processing, 39: 355-368, 1987.
Pizer et al. "Contrast-Limited Adaptive Histogram Equalization: Speed and Effectiveness", Proceedings of the First Conference on Visualization in Biomedical Computing, Atlanta, GA, USA, p. 337-345, May 22-25, 1990.
Socolinsky "Dynamic Range Constraints in Image Fusion and Visualization", Proceedings of the Signal and Image Processing, 6 P., 2000.
Spitzer et al. "Biological Gain Control for High Dynamic Range Compression", Final Program and Proceedings of the IS&T/SID 11th Color Imaging Conference: Color Science, Systems, and Applications, Scottdale, Arizona, USA, XP002282584, p. 42-50, Nov. 3, 2003. p. 42-45, Fig.1.
Spitzer et al. "Improvement of Illumination Artifacts in Medical Ultrasound Images Using a Biologically Based Algorithm for Compression of Wide Dynamic Range", Proceedings of the 2004 11th IEEE International Conference on Electronics, Circuits and Systems, ICECS 2004, Tel Aviv, Israel, Dec. 13-15, 2004, XP010774289, p. 435-438, Dec. 13, 2004.
Stark "Adaptive Image Contrast Enhancement Using Generalizations of Histogram Equalization", IRRR Transactions on Image Processing, 9(5): 889-896, May 2000.
Xing et al. "Measurement and Modeling of Center-Surround Suppression and Enhancement", Vision Research, 41: 571-583, 2001.
Yu et al. "A Fast and Adaptive Method for Image Contrast Enhancement", IEEE International Conference on Image Processing, ICIP 2004, Singapore, Oct. 24-27, 2004, 4 P., 2004.
Zimmerman et al. "An Evaluation of the Effectiveness of Adaptive Histogram Equalization for Contrast Enhancement", IEEE Transactions on Medical Imaging, 7(4): 304312, Dec. 1988.
Zuiderveld "Contrast limited Adaptive Histogram Equalization", Academic Press Graphics Gems Series, Graphic Gems IV, Chap. VIII.5: 474-485, 1994.
Communication Pursuant to Article 94(3) EPC Dated Aug. 7, 2013 From the European Patent Office Re. Application No. 08844123.3.
Applicant-Initiated Interview Summary Dated Apr. 24, 2014 From the U.S. Appl. No. 13/759,155.
Official Action Dated Jul. 10, 2014 From the US Patent and Trademark Office Re. U.S. Appl. No. 13/759,155.

\* cited by examiner

FIG. 3A

FIG. 3B (a) Lung 
(b) Soft tissues 
(c) Liver 
(d) Bone

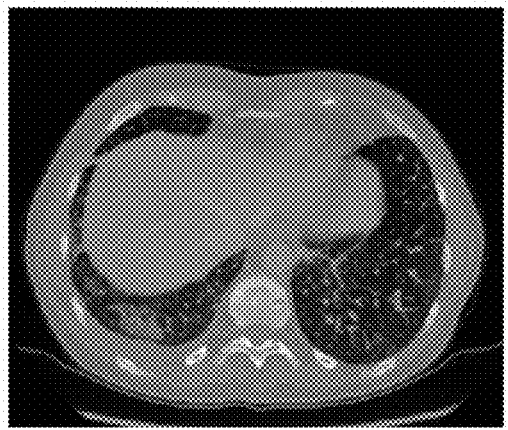 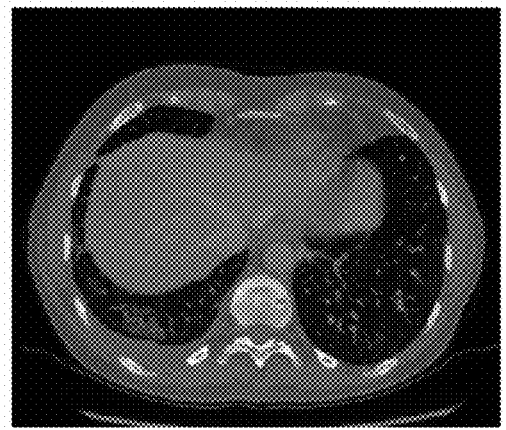
FIG. 19A             FIG. 19B
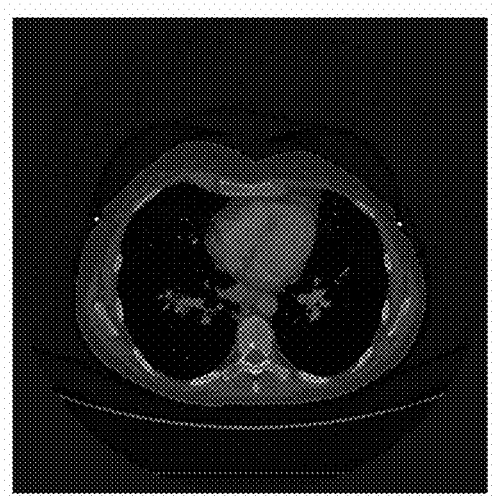 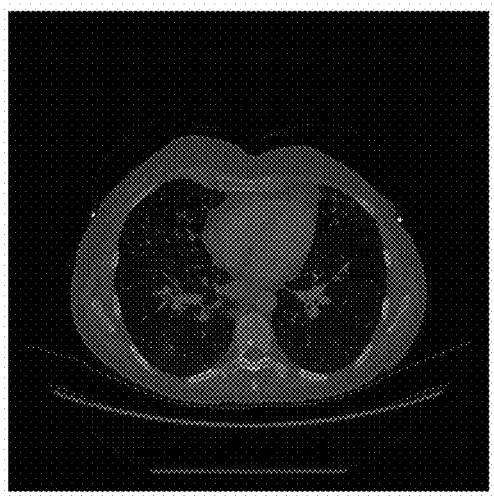
FIG. 20A             FIG. 20B FIG. 28A
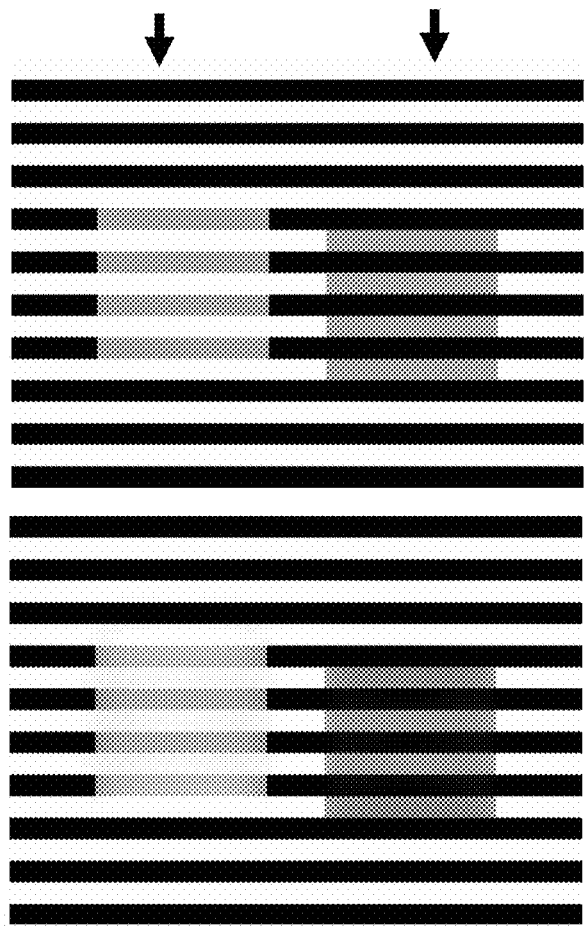
FIG. 28B
FIG. 28C
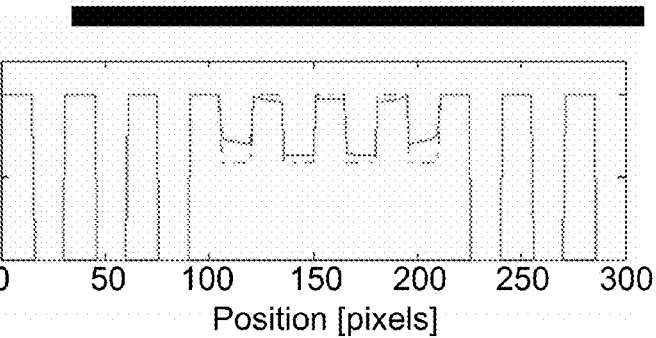
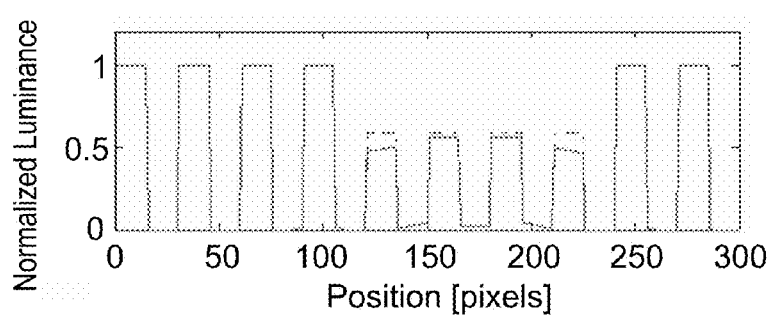

FIG. 29A
FIG. 29B
FIG. 29C
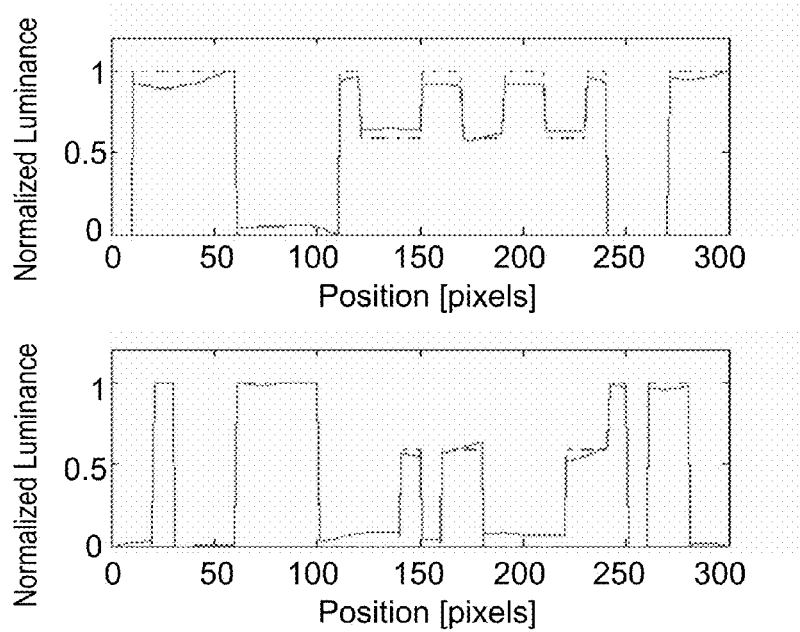

FIG. 30A
FIG. 30B
FIG. 30C
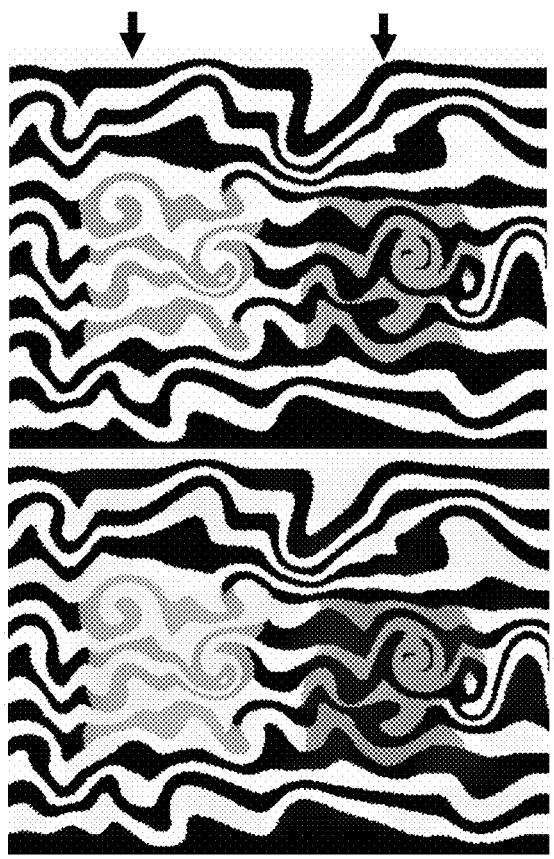
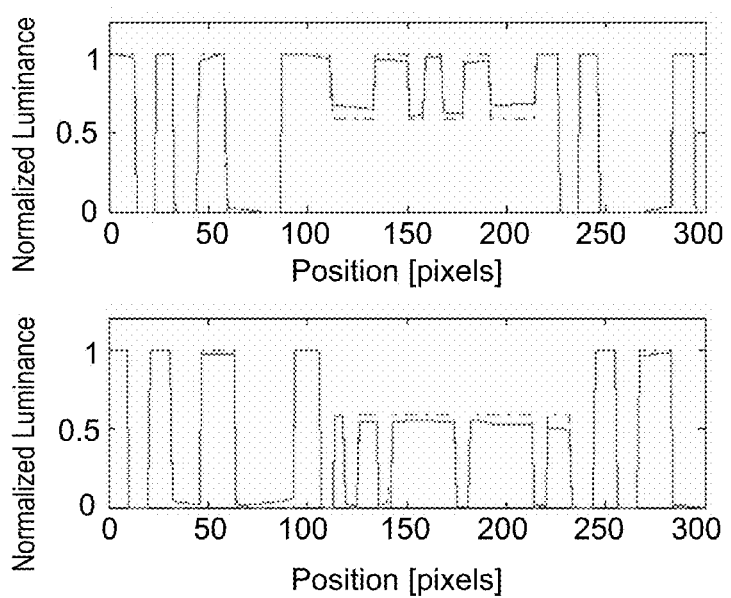

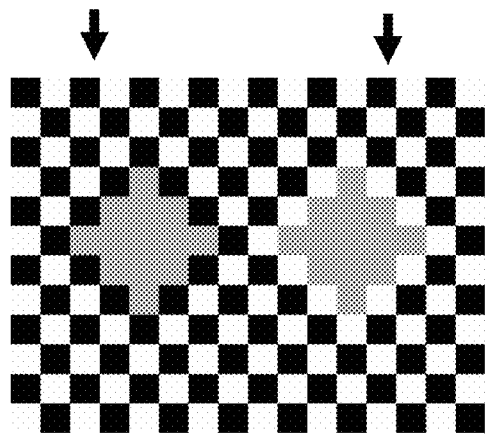
FIG. 32A
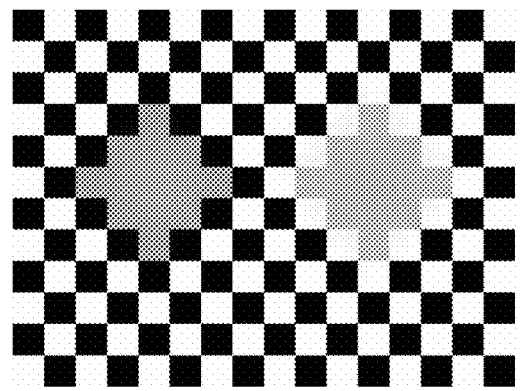
FIG. 32B
FIG. 32C
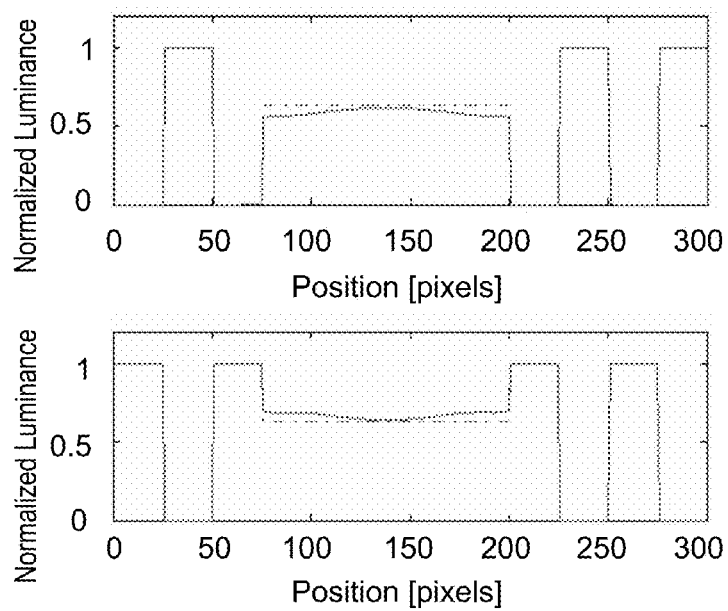

METHOD AND DEVICE FOR PROCESSING COMPUTERIZED TOMOGRAPHY IMAGES

RELATED APPLICATIONS

This Application is a National Phase of PCT Patent Application No. PCT/IL2008/001419 having International filing date of Oct. 29, 2008, which claims the benefit of U.S. Provisional Patent Application Nos. 61/193,065 filed on Oct. 27, 2008 and 61/000,735 filed on Oct. 27, 2007. The contents of the above Applications are all incorporated herein by reference.

FIELD AND BACKGROUND OF THE INVENTION

The present invention, in some embodiments thereof, relates to image processing and, more particularly, to a device and method for processing computerized tomography images.

A computerized tomography (CT) system is an X-ray system used to produce cross sectional images of organs. CT systems have become a major diagnostic modality in modem medicine and are widely used for many types of exams.

During a chest and abdominal scan, for example, a CT system produces a series of cross sectional images which include lung, soft tissues, liver and bone. Radiologists are able to examine these series of cross sectional images to diagnose a disease in one or more of the scanned organs.

Most exams are performed by subjective viewing of the cross-sectional images on an electronic display. This subjective viewing makes use of subjective discrimination of tissue types by density differences.

Generally, CT images present the attenuation coefficient of the X-ray radiation. The attenuation coefficient value typically ranges from −1000 (air) to 2500 (bones). Thus, the dynamic range of a CT image spans over three orders of magnitude. As a result of this dynamic range, linear intensity window setting techniques are used to view CT images, in order to provide equated contrast with all the clinical required details within each specific imaged tissue. In a common diagnostic procedure, a single CT slice is viewed four times (lung window, soft tissues window, liver narrow window and bone window).

A known method for dealing with CT images is processing a single window (which contain all the data with a very low contrast), as a standard image with low contrast. Accordingly, this type of algorithms made effort to enhance the contrast as in a standard image format. This type of algorithm uses Histogram Equalization technique and its variations (such as: Adaptive Histogram Equalization, AHE, and Contrast Limited Adaptive Histogram Equalization, CLAHE), see, e.g., Pizer at el. 1984, Lehr at el. 1985 and Pizer at el. 1987.

Another method for the enhancement of CT images employs a Multi-scale adaptive histogram equalization (MAHE), which is a variation of Histogram Equalization technique and wavelet (Jin Y at el 2001). This method is suitable for processing only chest CT images with emphasis for diagnosis of the lung tissue disorder.

Other researches, Lerman R at el 2006, Socolinsky AD 2000, tried to deal partially with the high dynamic issue by improving the appearance of only one or two types of tissue simultaneously.

Furthers studies, Chang D C at el. 1998, Yu at el. 2004, tried to solve the problem of low contrast in CT images.

Additional method has been suggested by Socolinsky AD 2000. A new methodology is introduced for incorporating dynamic range constrain into contrast-based image fusion algorithm. This method was applied to different devices including CT.

SUMMARY OF THE INVENTION

According to an aspect of some embodiments of the present invention there is provided a method of processing a computerized tomography (CT) image. The method comprises: (a) preprocessing the image using contrast enhancement weight function, thereby providing a preprocessed image having a first dynamic range; and (b) applying a companding procedure to the preprocessed image, so as to reduce the first dynamic range; thereby processing the image.

According to some embodiments of the invention the preprocessing of the image comprises, for each picture-element of the CT image, calculating a selective contribution using the contrast enhancement weight function and adding the selective contribution to an intensity of the picture-element.

According to some embodiments of the invention the first dynamic range is reduced to a second dynamic range being displayable on a display device.

According to some embodiments of the invention the method further comprises displaying the processed CT image on the display device using a single window setting selected in accordance with the second dynamic range.

According to an aspect of some embodiments of the present invention there is provided apparatus for processing a CT image. The apparatus comprises: (a) a preprocessing unit configured for preprocessing the image using a contrast enhancement weight function, thereby to provide a preprocessed image having a first dynamic range; and (b) a companding unit configured for applying a companding procedure to the preprocessed image, so as to reduce the first dynamic range.

According to an aspect of some embodiments of the present invention there is provided a CT system. The system comprises: (a) CT scanner for scanning a subject using X-ray radiation so as to provide a CT image; and (b) an image processing apparatus such as the apparatus described herein.

According to some embodiments of the invention the preprocessing unit comprises a selective contribution calculator configured for calculating, for each picture-element of the CT image, a selective contribution using the contrast enhancement weight function, and wherein the preprocessing unit is configured for adding the selective contribution to an intensity of the picture-element.

According to some embodiments of the invention the first dynamic range is reduced to a second dynamic range being displayable on a display device, so as to allow displaying the processed CT image on the display device using a single window setting selected in accordance with the second dynamic range. According to some embodiments of the invention the system comprises the display device.

According to some embodiments of the invention the selective contribution equals a local weight multiplied by the contrast enhancement weight function.

According to some embodiments of the invention the contrast enhancement weight function is characterized by low values for low intensities and high values for high intensities.

According to some embodiments of the invention the contrast enhancement weight function is characterized by negative values for low intensities and positive values for high intensities.

According to some embodiments of the invention the low intensities are characteristic intensities of lung tissue and soft tissue and the high pixel intensities are characteristic intensities of bones.

According to some embodiments of the invention the companding procedure comprises, for each picture element of the preprocessed image: (i) defining a surrounding region of picture elements and a remote region of picture elements; (ii) using intensity levels of each picture element of the surrounding and the remote regions for calculating at least one adaptation term; and (iii) assigning a new intensity level to the picture element based on the at least one adaptation term, the new intensity level being in a second dynamic range which is smaller than the first dynamic range.

According to some embodiments of the invention the companding procedure further comprises redefining the intensity level using a saturation function.

According to some embodiments of the invention the companding procedure further comprises defining a center region for the picture element.

According to some embodiments of the invention the at least one adaptation term comprises a local component and a remote component.

According to some embodiments of the invention the remote component comprises a selective enhancement function.

According to some embodiments of the invention the selective enhancement function is higher for characteristic intensities of lung tissue than for characteristic intensities of liver tissue.

According to some embodiments of the invention a rate of change of the selective enhancement function with the intensity is higher for characteristic intensities of soft tissue than for characteristic intensities of liver tissue and lung tissue.

According to some embodiments of the invention the selective enhancement function comprises a Bell function.

According to some embodiments of the invention the companding procedure comprises a procedure for reducing halo artifacts.

According to some embodiments of the invention the remote component is calculated, at least in part, using a contrast-contrast induction model.

According to some embodiments of the invention the contrast-contrast induction model comprises a local contrast calculated, at least in part, by integration of intensities over a region which includes the picture-element and the surrounding region, and a remote contrast calculated, at least in part, by integration of the local contrast over the remote region.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the Drawings:

FIG. 1 is a schematic illustration of a cross section of the human retina.

FIG. 2 is a flowchart diagram describing a method suitable for processing a computerized tomography image, according to various exemplary embodiments of the present invention.

Figures 3A, 3B:
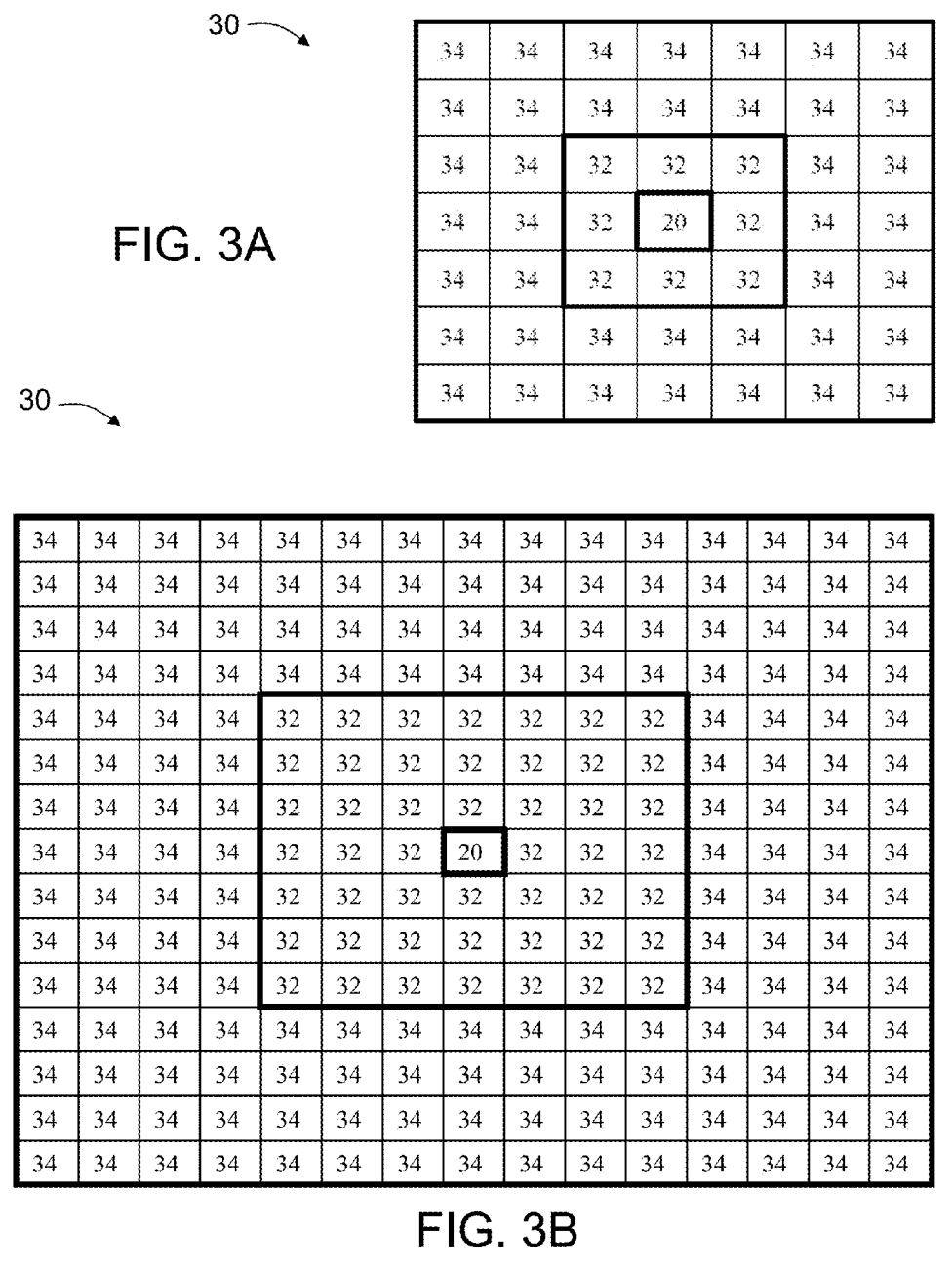

FIGS. 3A-B are schematic illustrations of a center, surrounding and remote regions, according to various exemplary embodiments of the present invention.

Figure 4A:
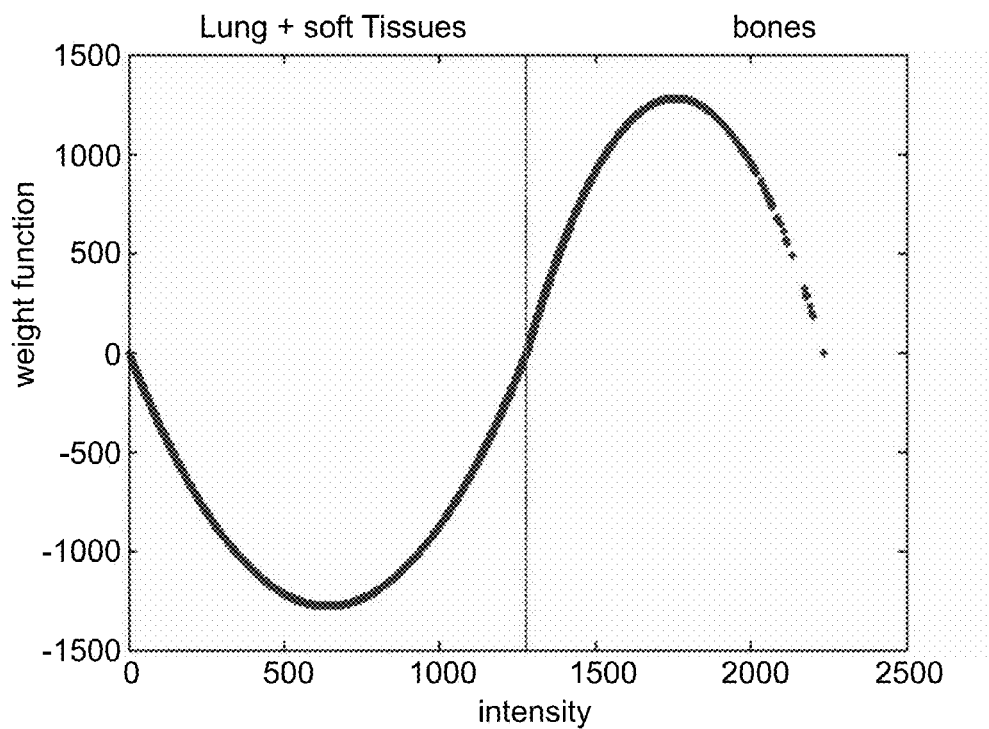

FIG. 4A is a graph of the contrast enhancement weight function W as a function of the intensity I, according to various exemplary embodiments of the present invention.

Figure 4B:
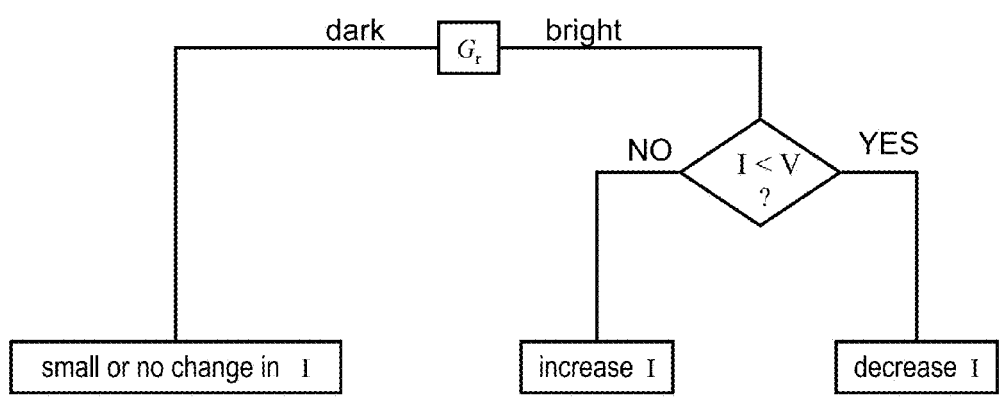

FIG. 4B is diagram describing the calculation of a selective contribution to the intensity using a local weight, according to various exemplary embodiments of the present invention.

Figure 5:
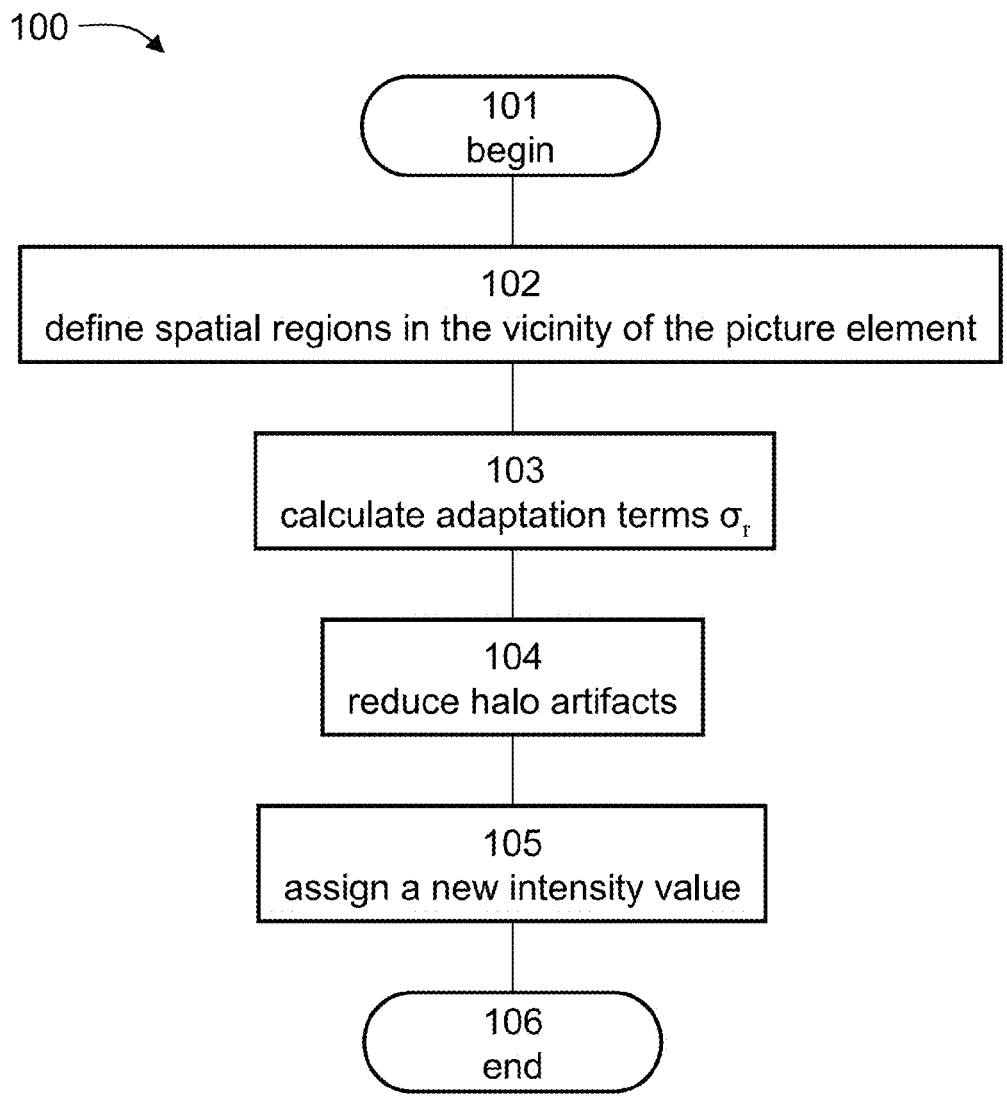

FIG. 5 is a flowchart diagram describing a companding procedure, according to various exemplary embodiments of the present invention.

Figure 6A:
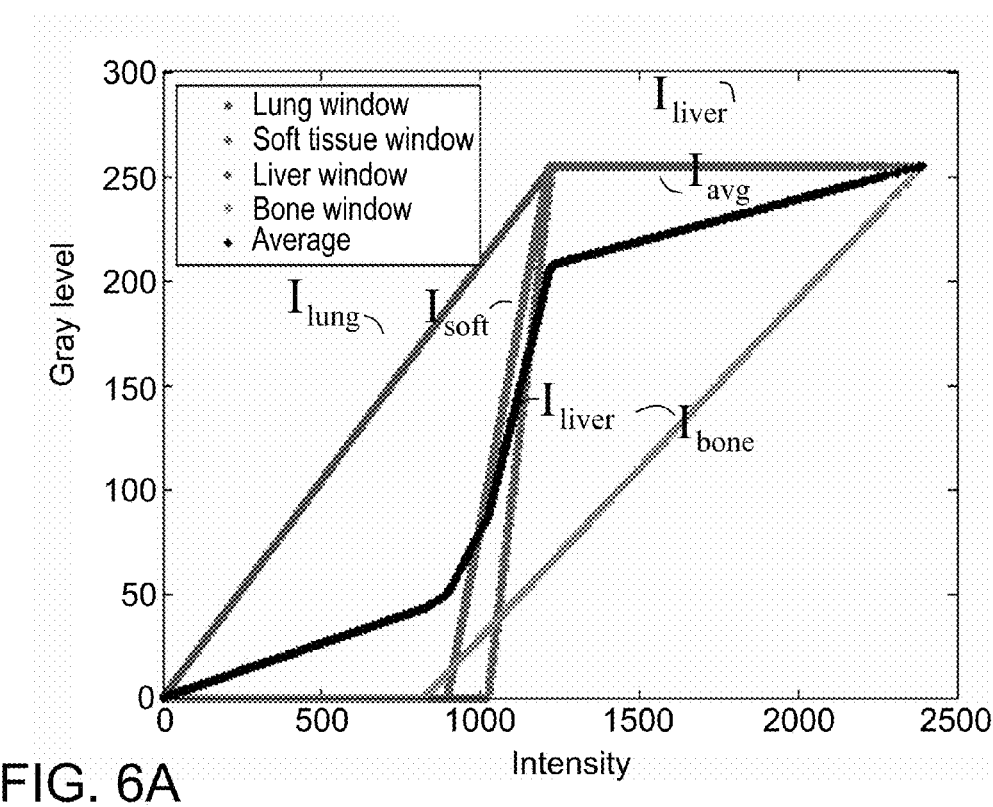

FIG. 6A shows a typical linear intensity window setting.

Figure 6B:
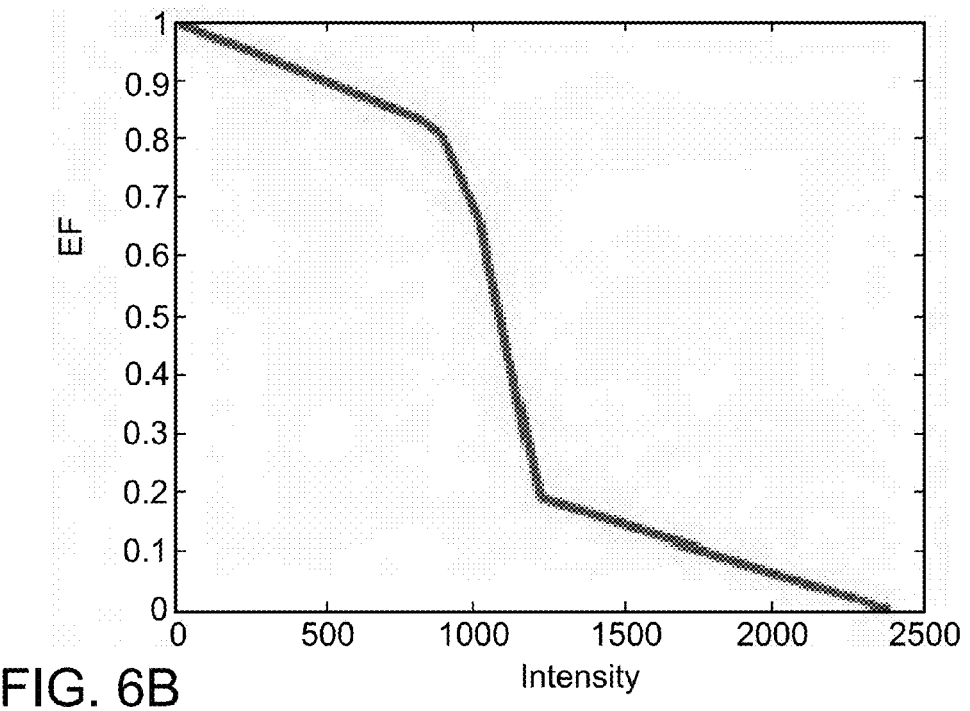

FIG. 6B shows a selective enhancement function corresponding to the linear intensity window setting of FIG. 6A.

Figure 7:
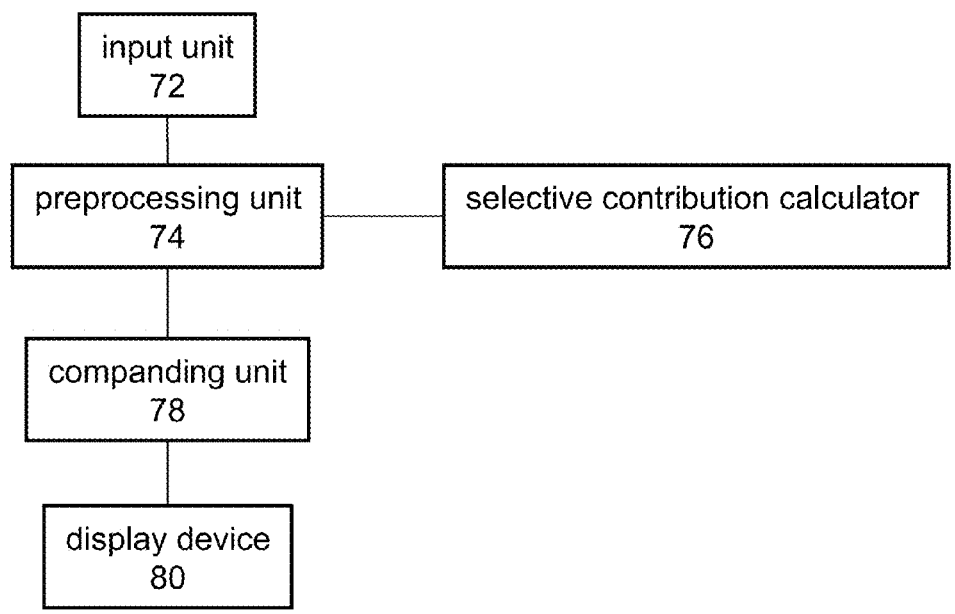

FIG. 7 is a simplified illustration of an apparatus for processing a CT image, according to various exemplary embodiments of the present invention.

Figure 8:
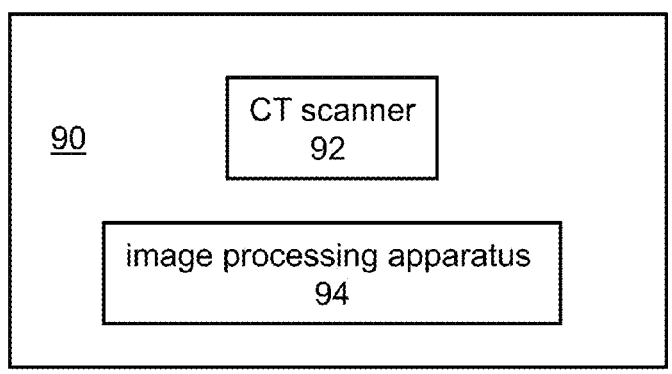

FIG. 8 is a simplified illustration of a computerized tomography system, according to various exemplary embodiments of the present invention.

Figure 9A:
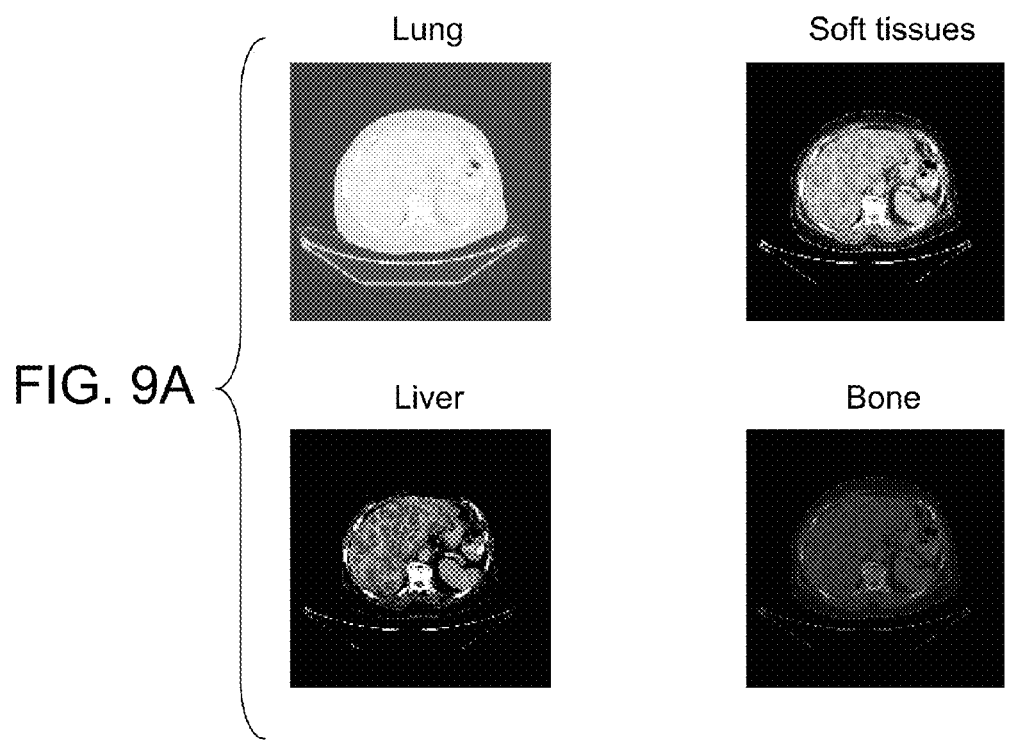

FIG. 9A shows another CT image as viewed in traditional four-window setting method.

Figure 9B:

FIG. 9B shows the CT image of FIG. 9A following processing in accordance with the teachings of some embodiments of the present invention, and displayed using a single window setting.

Figure 10A:
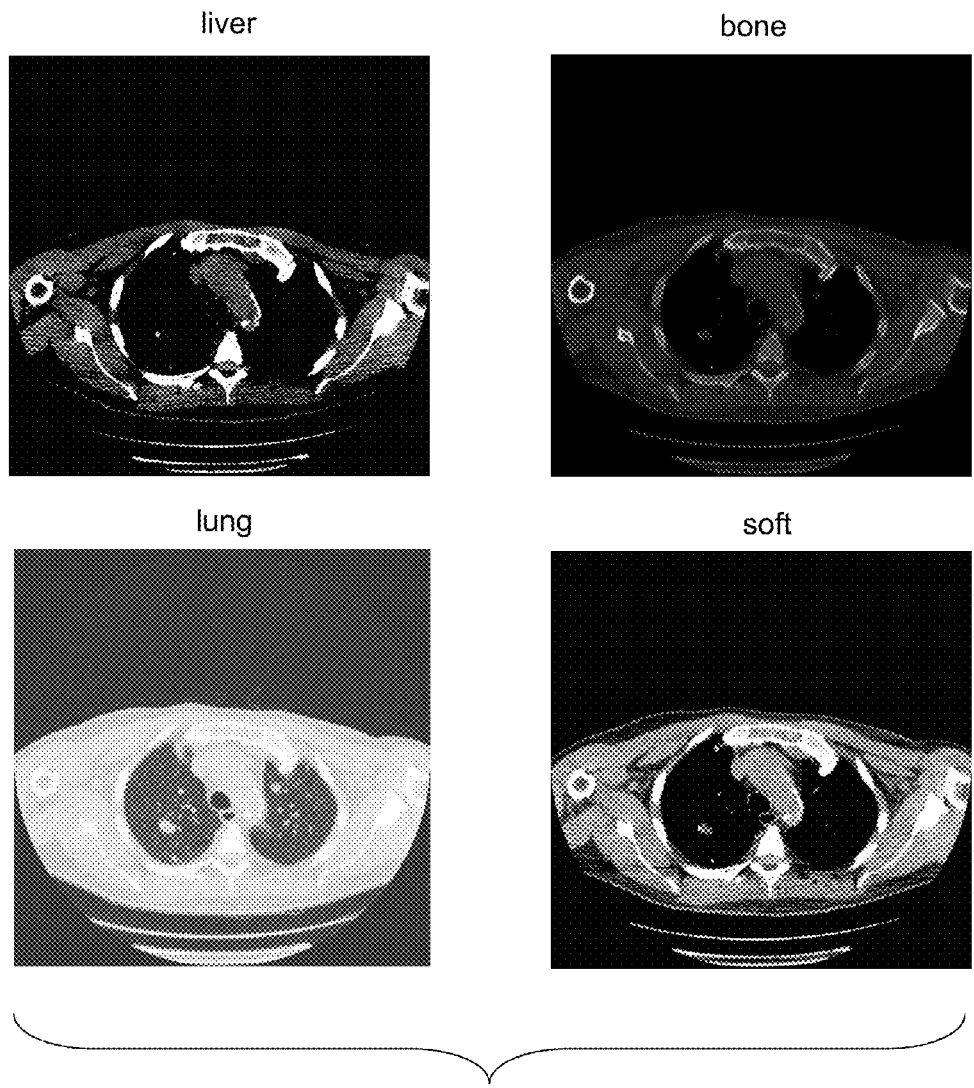

FIG. 10A shows another CT image as viewed in traditional four-window setting method.

Figure 10B:
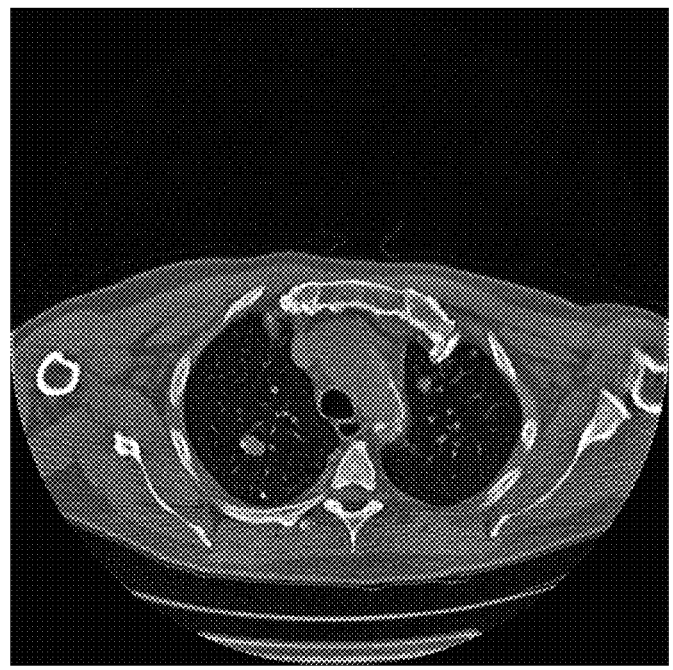

FIG. 10B shows the CT image of FIG. 10A following processing in accordance with the teachings of some embodiments of the present invention, and displayed using a single window setting.

Figure 11A:
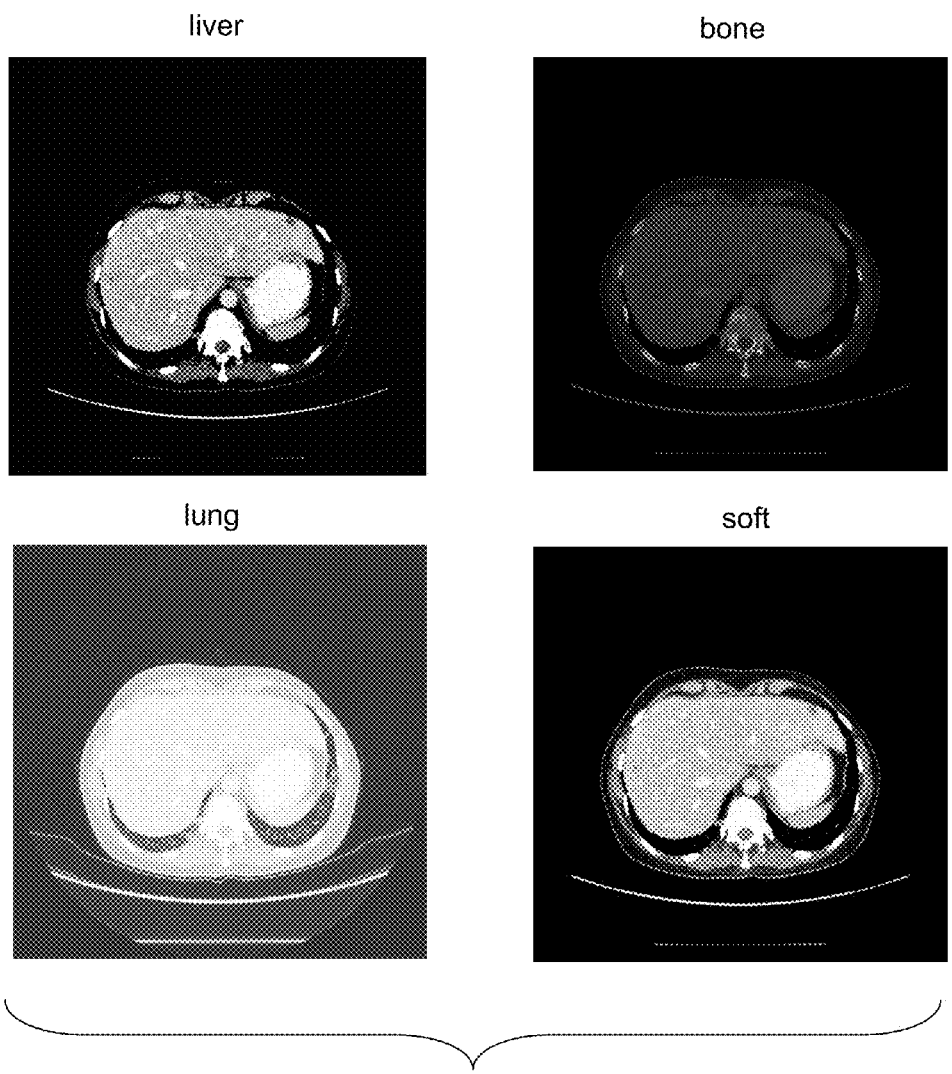

FIG. 11A shows another CT image as viewed in traditional four-window setting method.

Figure 11B:

FIG. 11B shows the CT image of FIG. 11A following processing in accordance with the teachings of some embodiments of the present invention, and displayed using a single window setting.

Figure 12A:
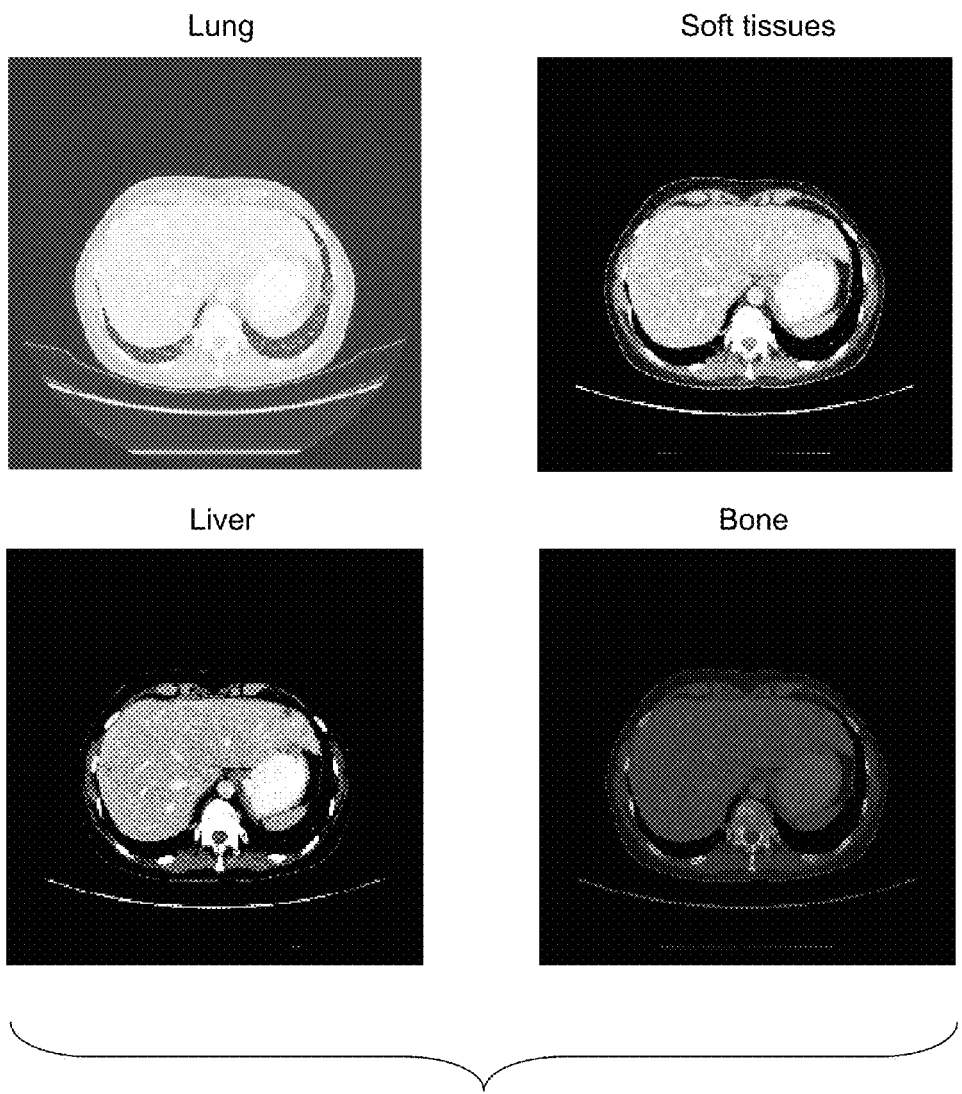

FIG. 12A shows another CT image as viewed in traditional four-window setting method.

Figure 12B:

FIG. 12B shows the CT image of FIG. 12A following processing in accordance with the teachings of some embodiments of the present invention, and displayed using a single window setting.

Figure 13A:
Figure 13B:
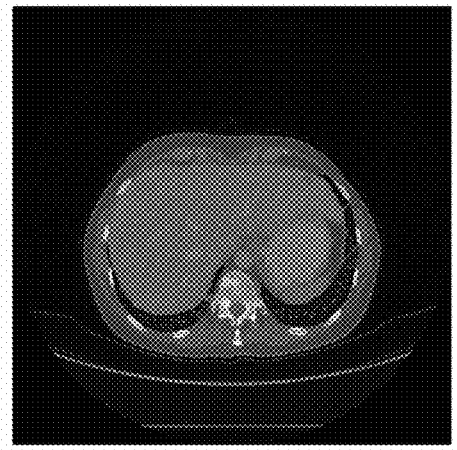

FIGS. 13A-B demonstrate the effect of a preprocessing phase on CT images in embodiments of the invention in which a local weight is calculated using a remote overall intensity.

Figure 14A:
Figure 14B:
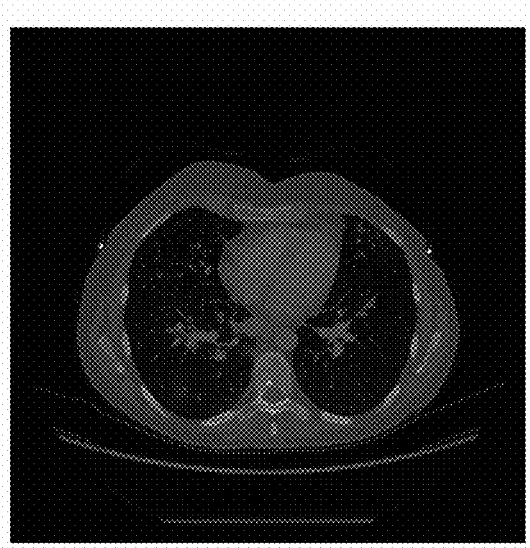

FIGS. 14A-B demonstrate the effect of a local weight on the result of the preprocessing in embodiments of the invention in which the local weight is calculated using a remote overall intensity.

FIGS. 15A-D demonstrate the effect of using different sets of parameters for CT scans acquired with and without contrast medium injection, according to some embodiments of the present invention.

Figure 16A:
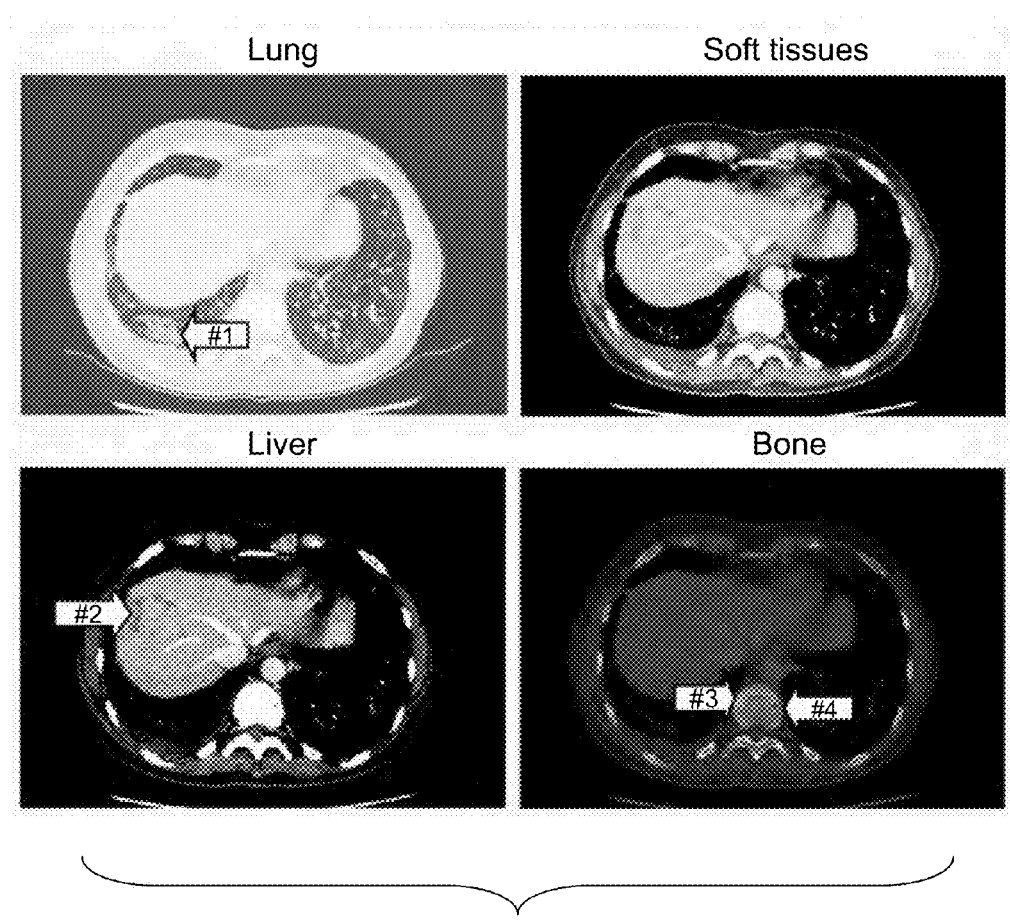

FIG. 16A shows another CT image as viewed in traditional four-window setting method.

Figure 16B:
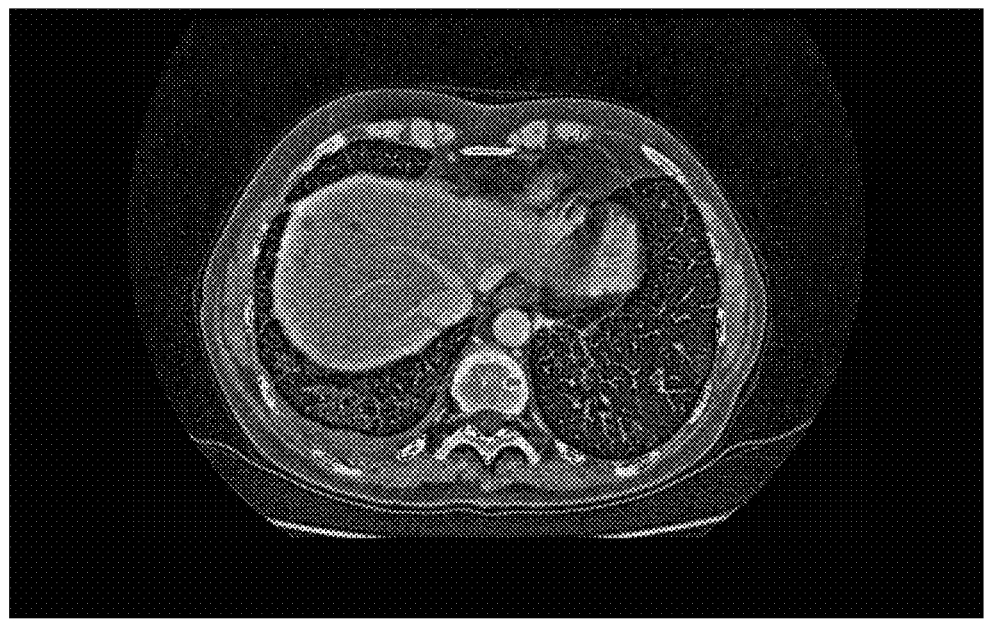

FIG. 16B shows the CT image of FIG. 16A following processing in accordance with the teachings of some embodiments of the present invention, and displayed using a single window setting.

Figure 17A:
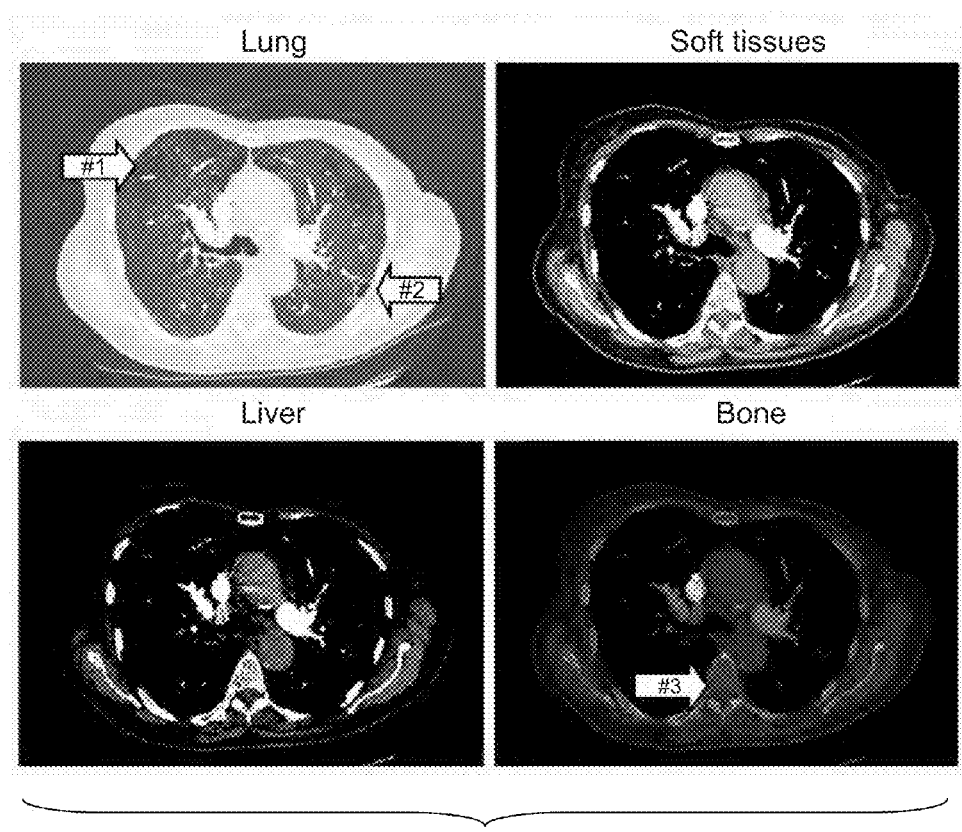

FIG. 17A shows another CT image as viewed in traditional four-window setting method.

Figure 17B:
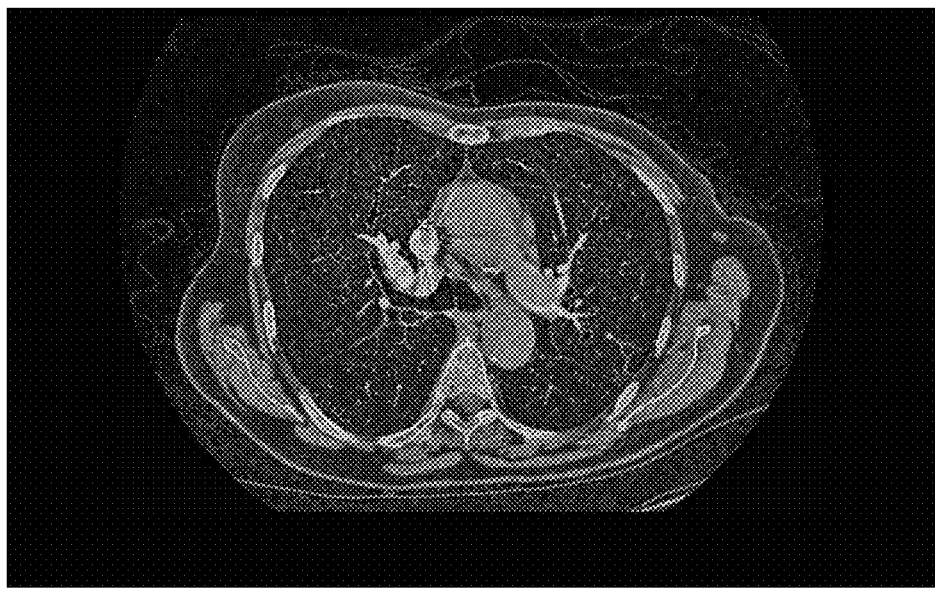

FIG. 17B shows the CT image of FIG. 17A following processing in accordance with the teachings of some embodiments of the present invention, and displayed using a single window setting.

Figure 18A:
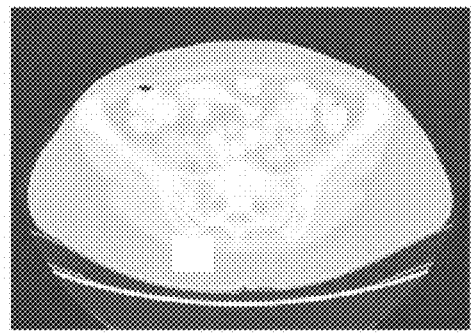
Figure 18A:
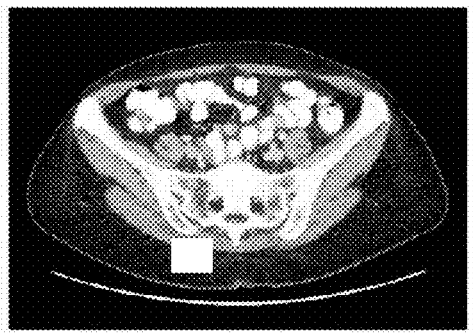
Figure 18A:
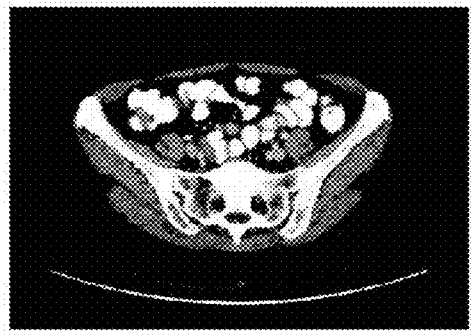
Figure 18A:

FIG. 18A shows another CT image as viewed in traditional four-window setting method.

Figure 18B:
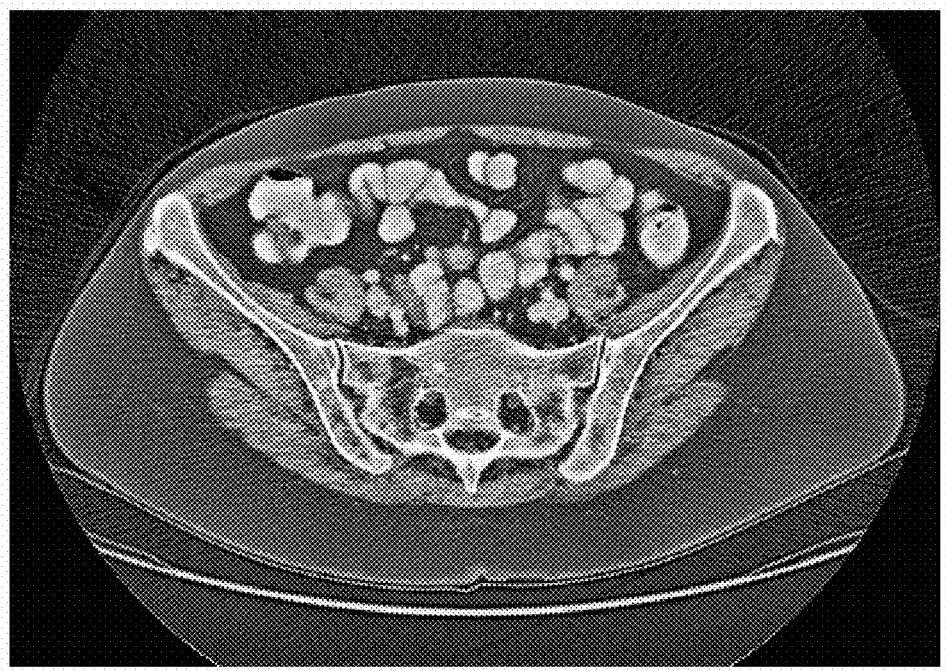

FIG. 18B shows the CT image of FIG. 18A following processing in accordance with the teachings of some embodiments of the present invention, and displayed using a single window setting.

FIGS. 19A-B demonstrate the effect of a preprocessing phase on CT images in embodiments of the invention in which a local weight is calculated using a surround overall intensity.

FIGS. 20A-B demonstrate the effect of a local weight on the result of the preprocessing in embodiments of the invention in which the local weight is calculated using a surround overall intensity.

FIGS. 21A-F demonstrate the effect of the selective enhancement function shown in FIG. 6B on CT images, according to some embodiments of the present invention.

Figure 22:
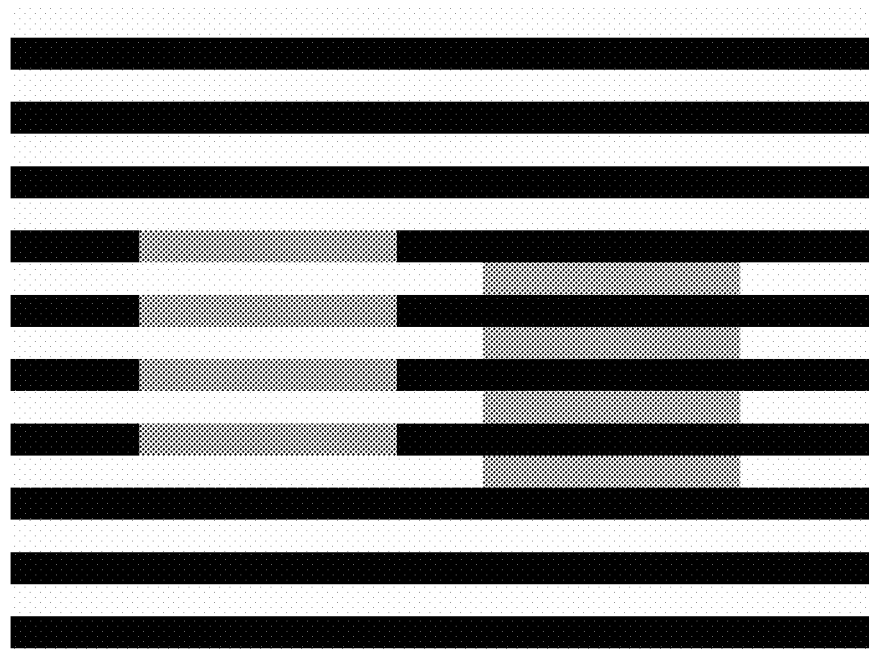

FIG. 22 shows a brightness assimilation effect, known as "White's effect".

Figure 23:
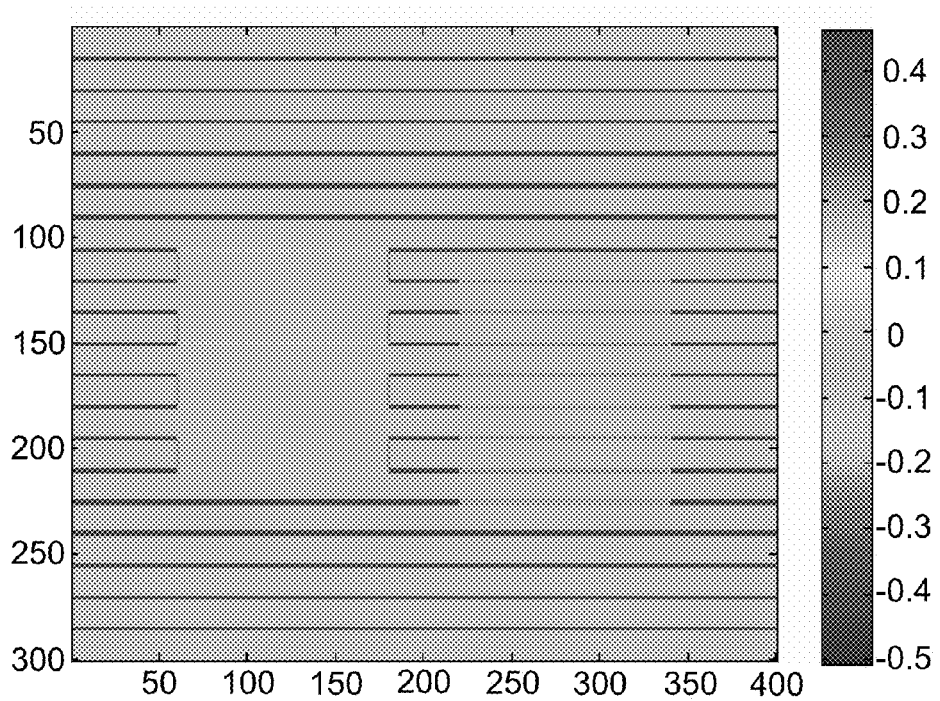

FIG. 23 shows intermediate results a contrast-contrast model, according to various exemplary embodiments of the present invention.

Figure 24:
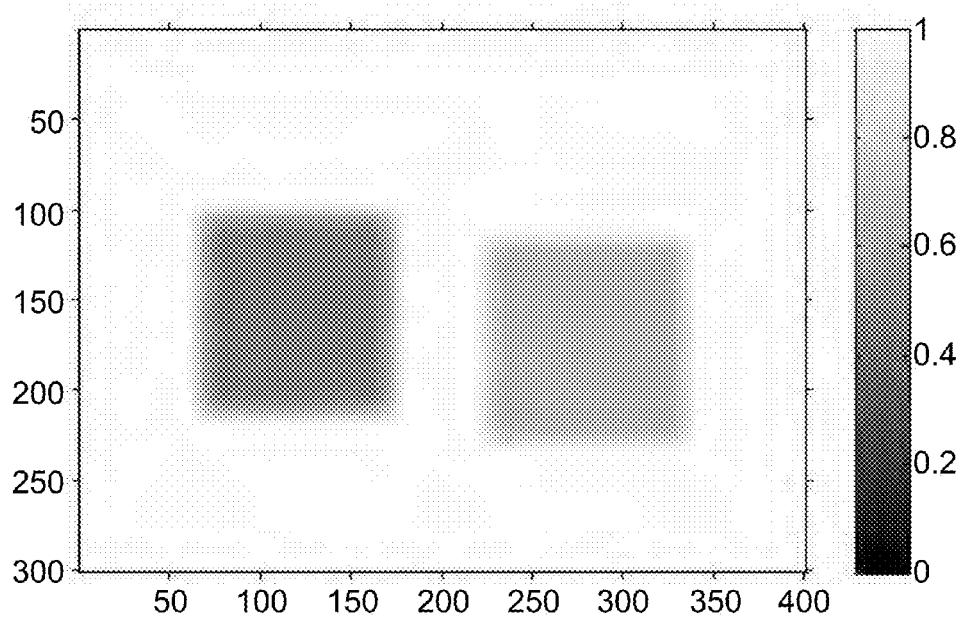

FIG. 24 shows a local contrast in a contrast-contrast model, according to various exemplary embodiments of the present invention.

Figure 25:
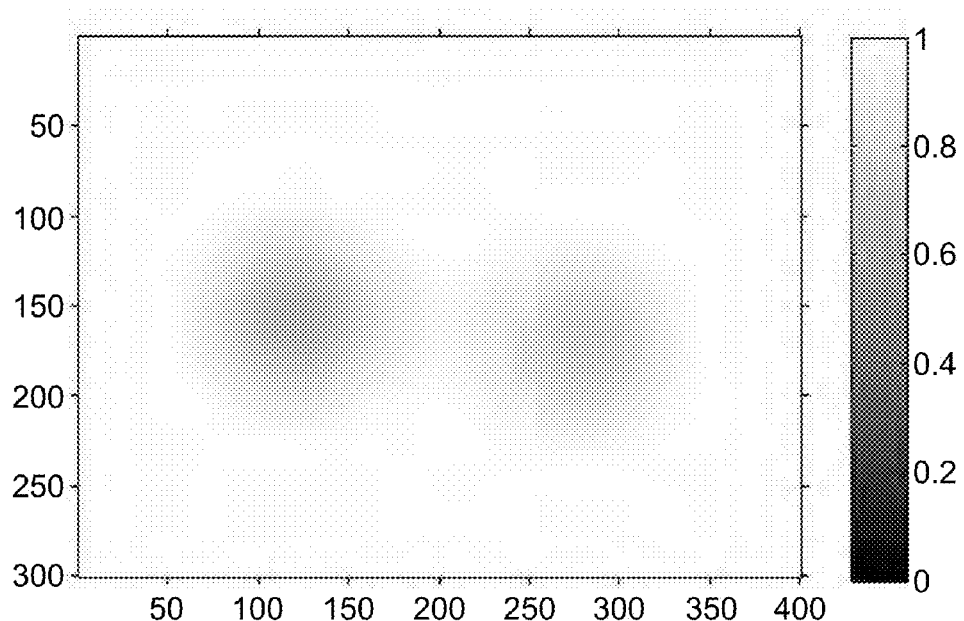

FIG. 25 shows a remote contrast in a contrast-contrast model, according to various exemplary embodiments of the present invention.

Figure 26:
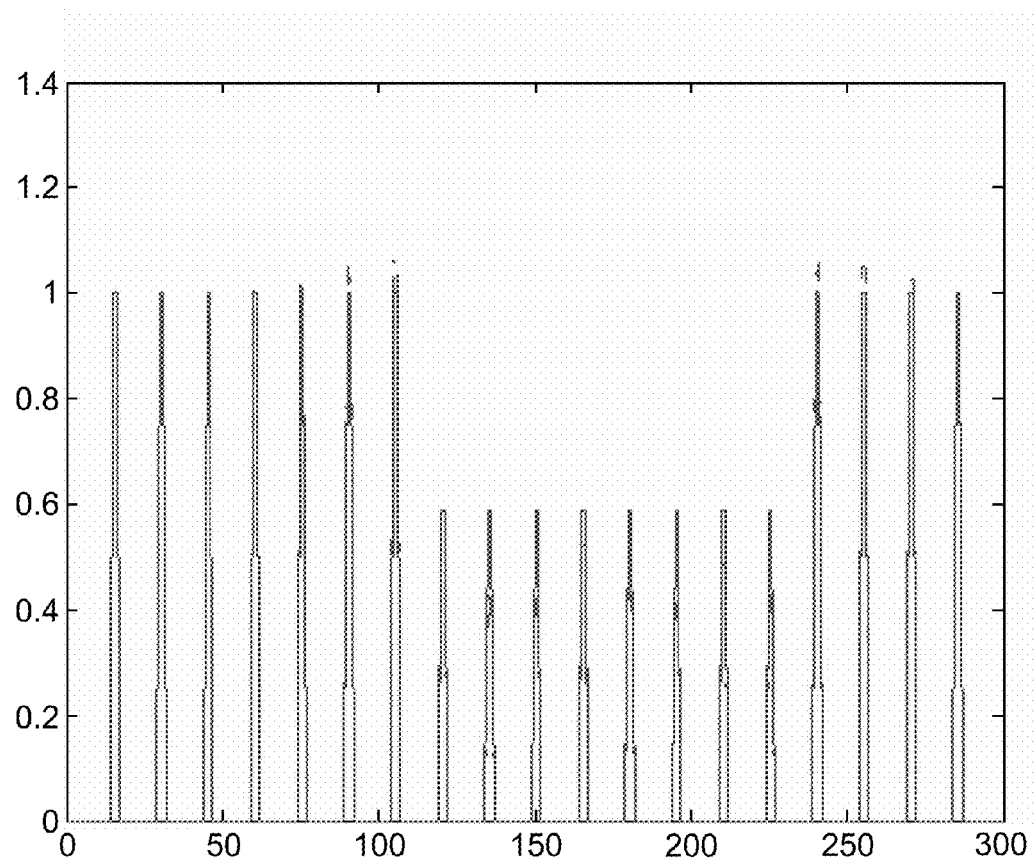

FIG. 26 shows second order opponent receptive fields before (blue) and after (red) adaptation, performed using contrast-contrast model, according to various exemplary embodiments of the present invention.

Figure 27A:
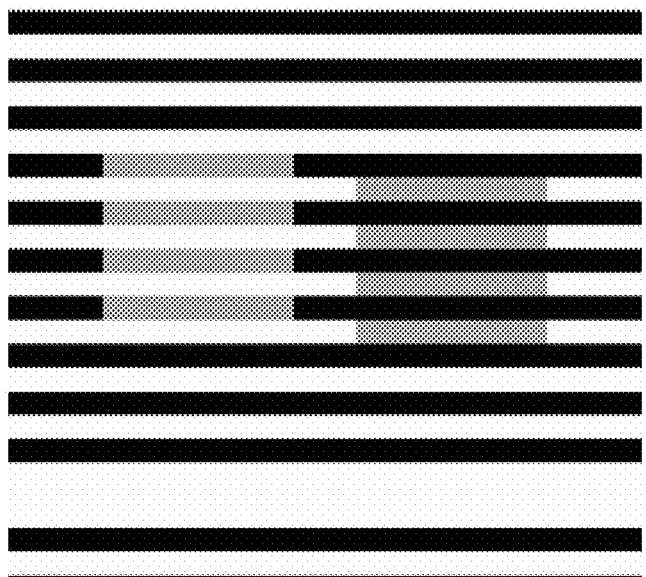
Figure 27B:
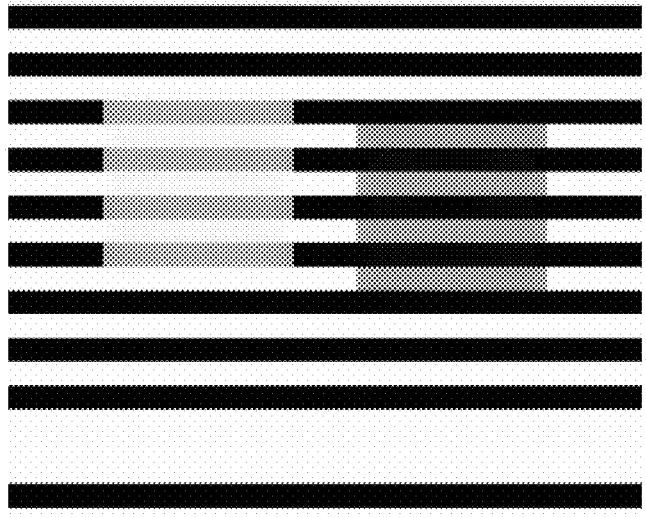
Figure 27C:
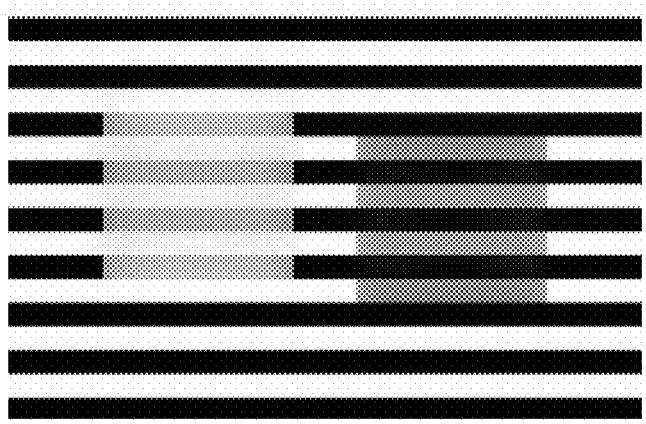

FIGS. 27A-C show iterative results (iteration Nos. 1, 100 and 1000, respectively) of transformation of adapted second order opponent receptive fields to perceived luminance, according to various exemplary embodiments of the present invention.

FIGS. 28A-C show results obtained by employing the contrast-contrast model of the present embodiments to the White's effect.

FIGS. 29A-C show results obtained by employing the contrast-contrast model of the present embodiments to random Stuart's rings.

FIGS. 30A-C show results obtained by employing the contrast-contrast model of the present embodiments to an image which demonstrates an assimilation effect not connected to specific periodicity, oriented lines or expected shapes.

Figure 31A:
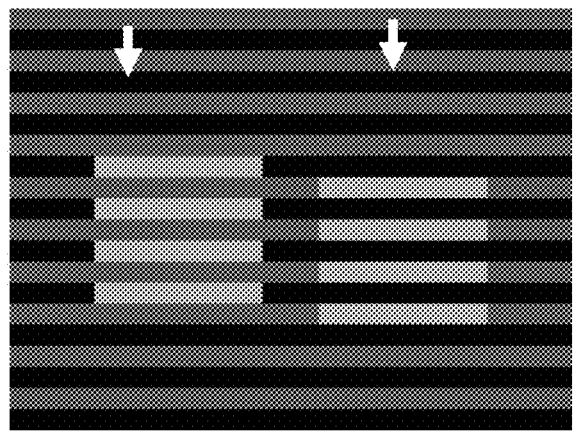
Figure 31B:
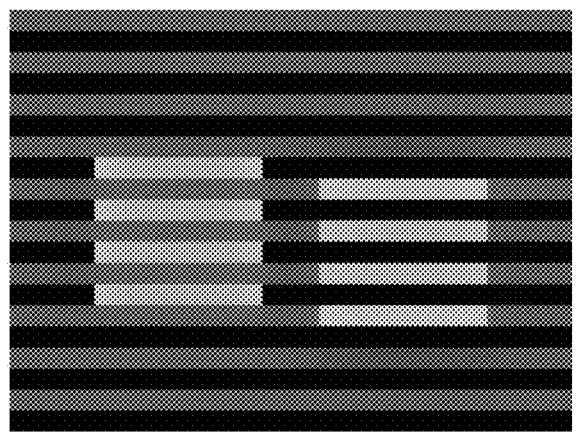
Figure 31C:
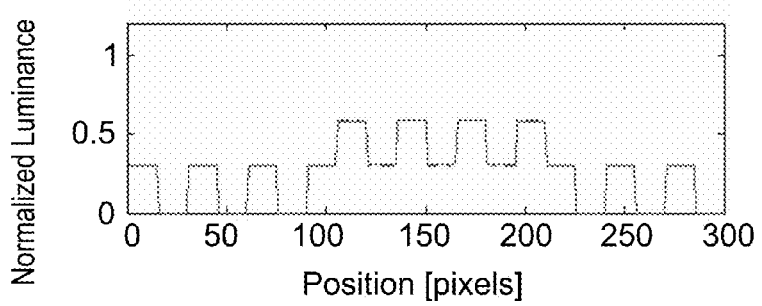
Figure 31C:
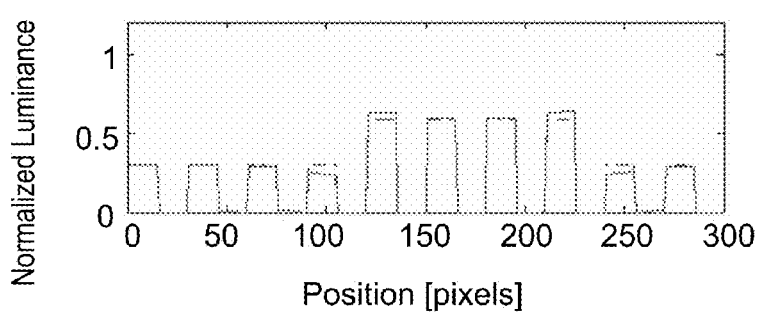

FIGS. 31A-C show results obtained by employing the contrast-contrast model of the present embodiments to the inverted White's effect.

FIGS. 32A-C show results obtained by employing the contrast-contrast model of the present embodiments to the Checkerboard contrast illusion.

Figure 33A:
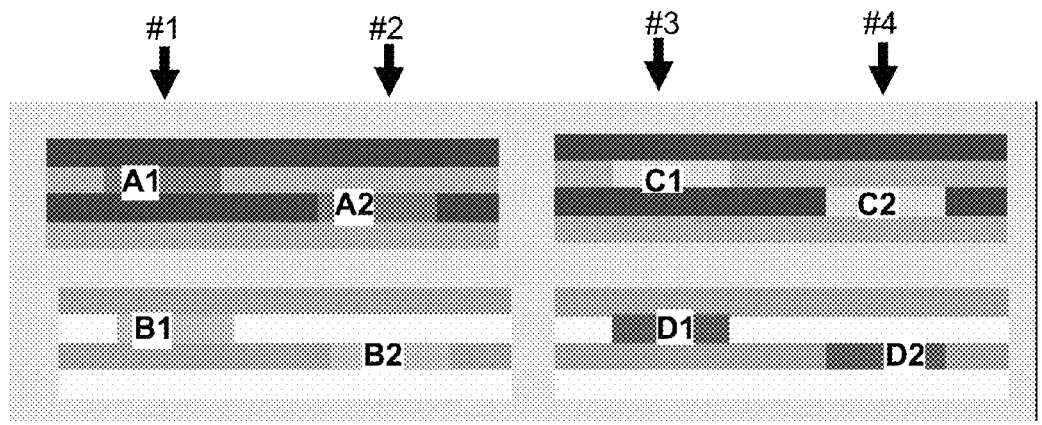
Figure 33B:
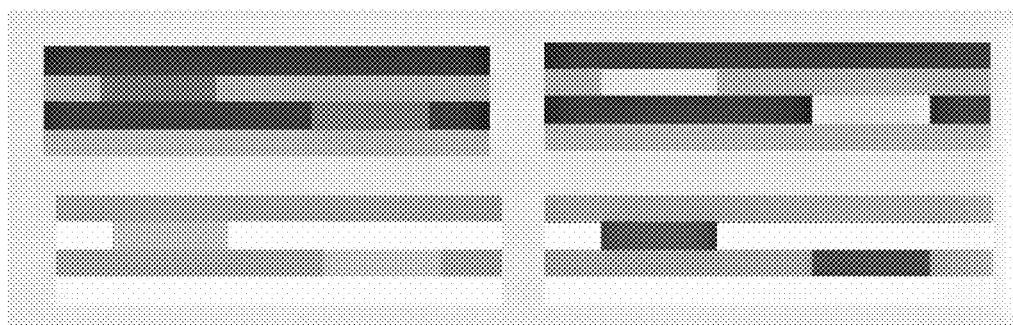
Figure 33C:
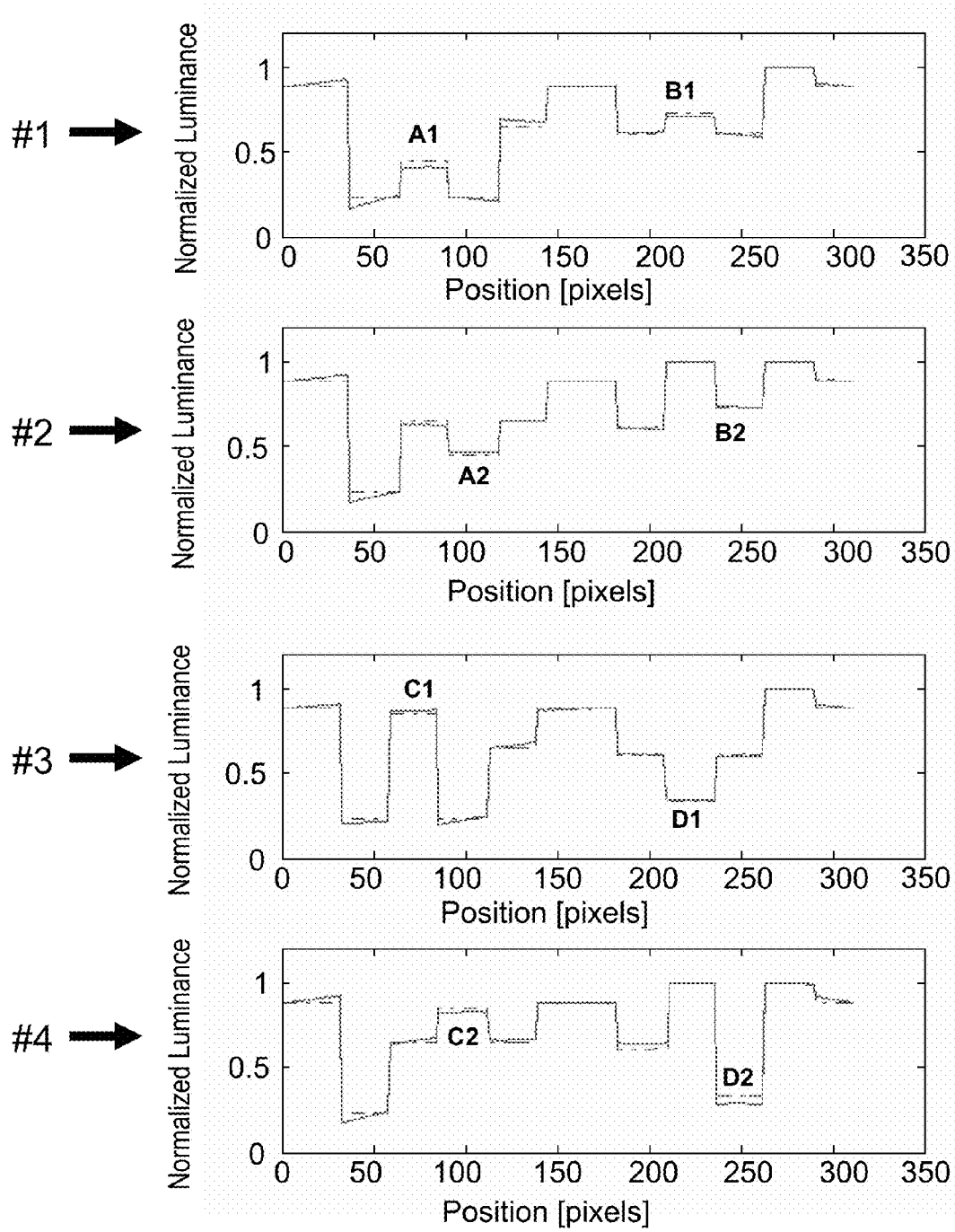

FIGS. 33A-C show results obtained by employing the contrast-contrast model of the present embodiments to the White's effect and the inverted White's effect.

Figure 34A:
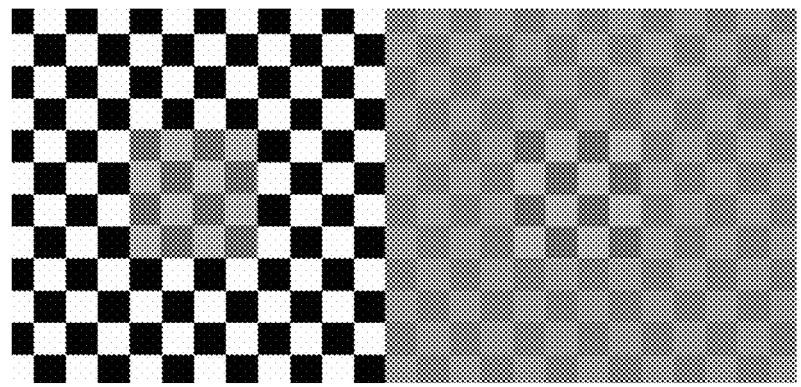
Figure 34B:
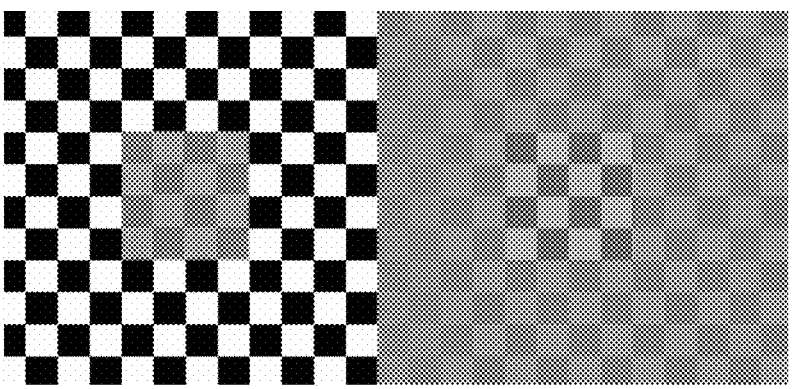
Figure 34C:
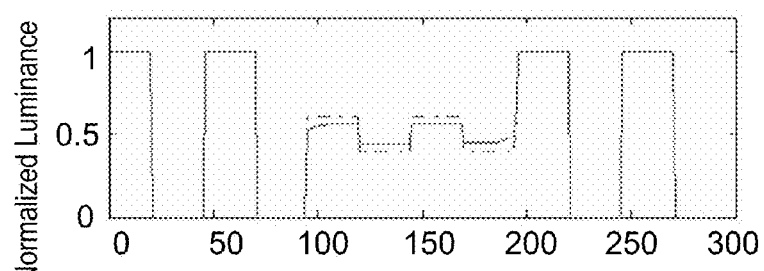
Figure 34C:
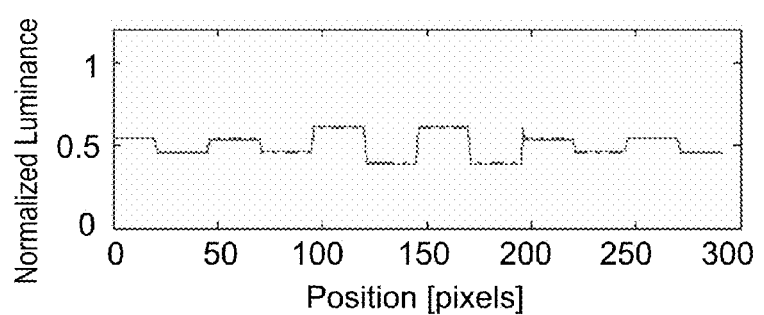

FIGS. 34A-C show the results using a classical contrast-contrast effect.

Figure 35A:
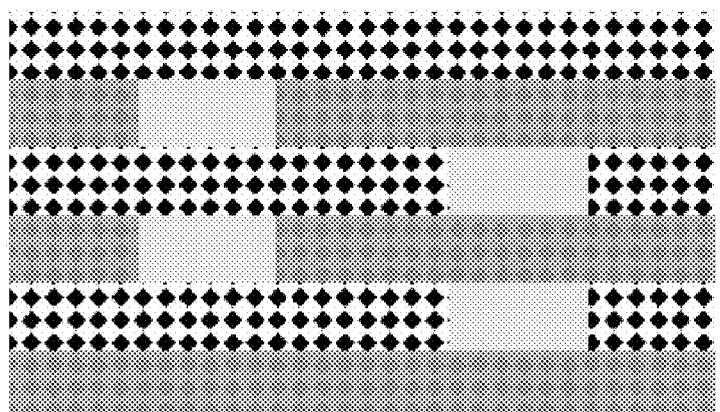
Figure 35B:
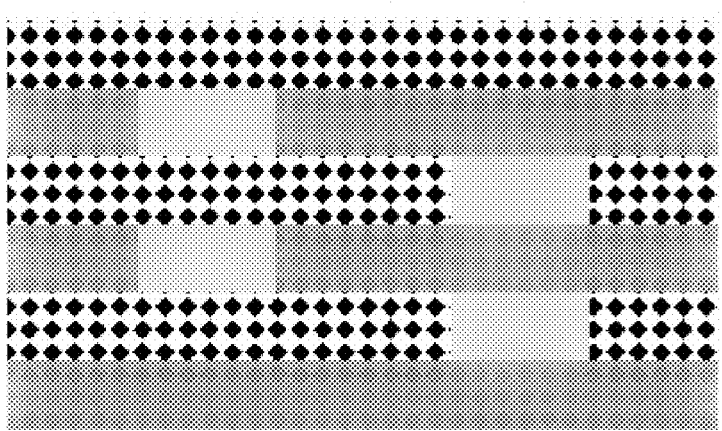
Figure 35C:
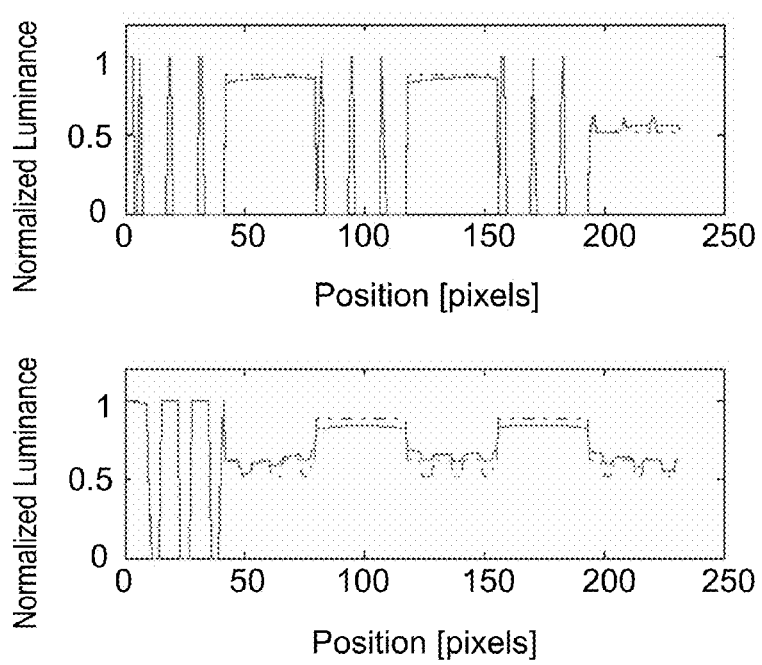

FIGS. 35A-C show results obtained by employing the contrast-contrast model of the present embodiments to first and second-order White's configurations.

Figure 36A:
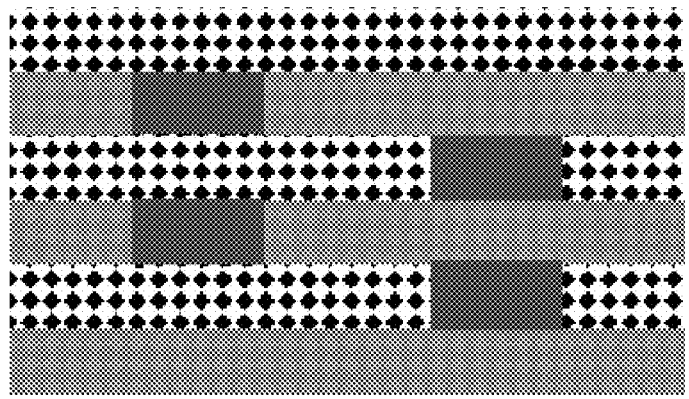
Figure 36B:
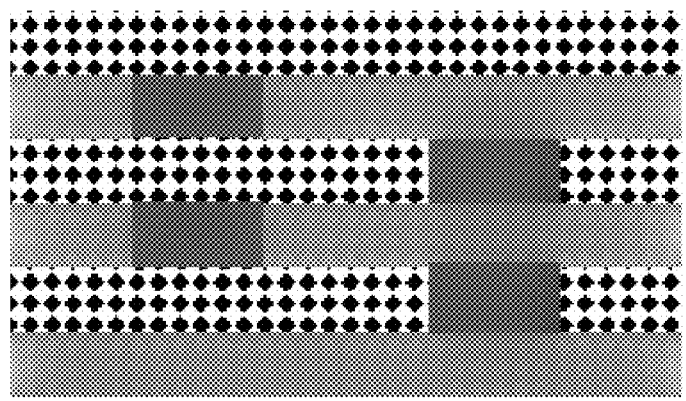
Figure 36C:
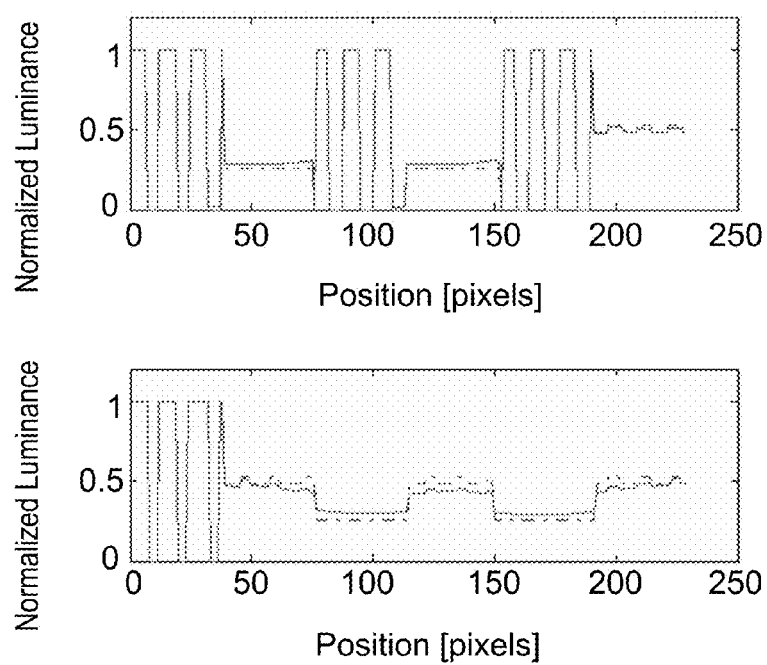

FIGS. 36A-C show results obtained by employing the contrast-contrast model of the present embodiments to first and second-order White's configurations on dark gray test stimuli.

DESCRIPTION OF THE EXEMPLARY EMBODIMENTS

The present invention, in some embodiments thereof, relates to image processing and, more particularly, to a device and method for processing computerized tomography images.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
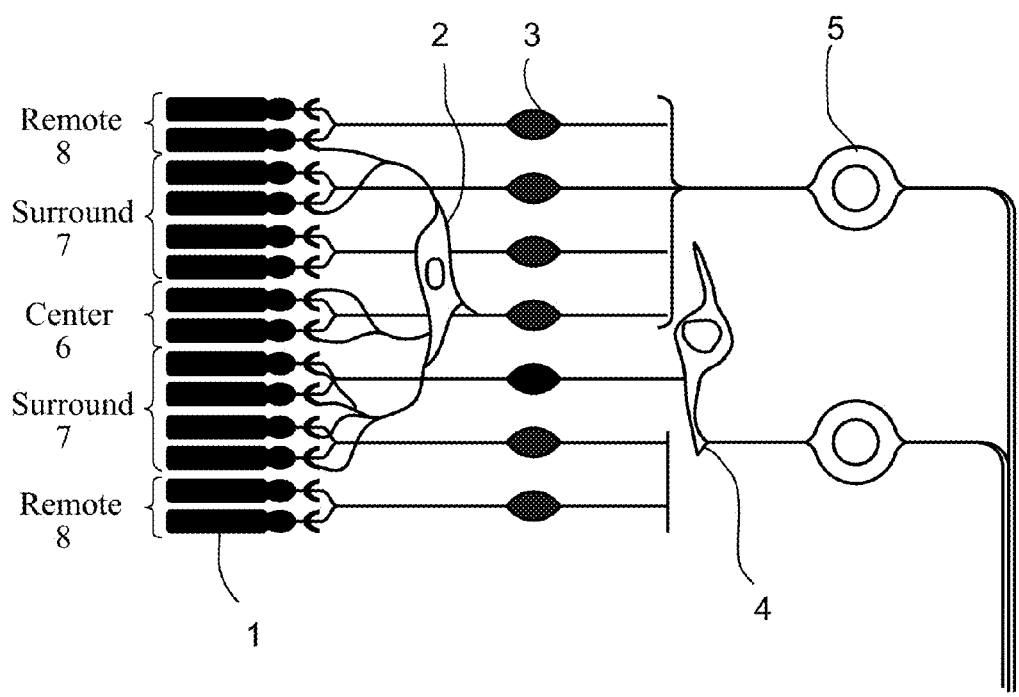

Referring now to the drawings, FIG. 1 illustrates a schematic cross section of the human retina, showing that the retina consists of five layers of cells, receptors 1, horizontal cells 2, bipolar cells 3, amacrine cells 4, and retinal ganglion cells 5. Receptors 1 are stimulated by light and pass information to retinal ganglion cells 5, by a sequential series of biochemical and then electrical messages, through the intermediate layers of the retina.

Ganglion cells 5 are known to perform "gain control" operation, in which the response curve, rather than being a constant saturation curve, it is dynamically shifted from one saturation curve to another, after a certain amount of illumination has been viewed, thus leading to a new adaptation state of ganglion cells 5 [R. Dahari and H. Spitzer, "Spatio-Temporal Adaptation Model for Retinal Ganglion Cells", *J. Opt. Soc. Am., A:*13, 419-439, 1996].

A known physiological phenomenon in the human vision system is the so called "induction phenomenon", according to which the perceived image, is not just a simple function of the stimulus from specific receptor cell, but rather a more complicated combination of other stimuli, originating from other receptors in the field of view.

Hence, considering a specific ganglion cell 5', the indirect input of ganglion cell 5' includes both receptors 6 of the center receptive field area and receptors 7 of the nearby, referred to below as surrounding, receptive field area. The human vision mechanism operates in retinal ganglion cell 5', by subtracting surround responses from center responses. In addition, it is believed that the processing at the retinal ganglion cell level further includes influences of responses from receptors 8 being in a "remote" area of the receptive field that is even farther than the "surround" area from the "center" area, which influences are typically through the amacrine cells 4 and horizontal cells 2.

The human vision mechanism has outstanding image processing capability. It is capable of simultaneously processing several orders of magnitudes of light intensities. In extreme light conditions, there are often situations that the signal-to-noise ratio of the optical signal collected from the scene is low. To maximize the signal-to-noise ratio, the human vision mechanism is capable of "inverting" the light intensities of the retinal receptive fields. Some receptive fields, also referred to as "off" receptive fields, can yield a positive high response from the center region while the intensity of the light is low. For example, referring to receptors 6 and 7 in FIG. 1, the inversion of the light intensity is done by subtracting the center responses from the surround responses, once the aforementioned adaptation process is completed. The image information is thus a weighted sum of the receptive fields (often referred to as the "on" receptive fields) and the "off" receptive fields.

U.S. Pat. Nos. 5,771,312 and 6,931,152, the contents of which are hereby incorporated by reference, discloses an advanced algorithm for partially correcting color images for colored illumination without knowledge of either the color or the intensity of the illumination. This algorithm exploits the above physiological mechanisms and phenomena of the visual system, to process the color channels of an image, thereby to achieve a "color constancy", in which the perceived color remains more constant and decouples from the spectral composition of the light reflected from it under varying colored illumination.

While conceiving the present invention it has been hypothesized and while reducing the present invention to practice it has been realized that the human vision principles of the achromatic retinal cells may be exploited to process a CT image, for the purpose of reducing the dynamic range of the CT image. It was found by the Inventors of the present invention that the dynamic range of the CT image can be reduced to a second dynamic range which displayable on a display device.

For example, it was found by the Inventors of the present invention that a CT image having a dynamic range which spans over about 4000 intensity values, can be processed to provide a processed image having a dynamic range which span over no more than 256 intensity values. Such reduced dynamic range can be displayed on conventional display device, whereby each intensity value is associated with a different grey-level. This is advantageous over the traditional linear intensity window setting techniques, since it allows displaying the image without dividing the output into several windows. Thus, in various exemplary embodiments of the invention, once the CT image is processed as described below, it is displayed on a display device using a single window setting selected in accordance with the reduced dynamic range.

As used herein, an "image" or "CT image" refers to a plurality of gridwise arranged picture-elements (e.g., pixels, arrangements of pixels) treated collectively as an array. The imagery information is in a form of discrete intensity values associated with the picture-elements, such that each picture-element is associated with an intensity value. Thus, the term "image" or "CT image" as used herein can include purely mathematical objects, and does not necessarily correspond to a physical image, although the original input image certainly do correspond to physical images. The imagery information stored in an array of picture-elements generally corresponds to a single CT slice.

The term "pixel" is sometimes abbreviated to indicate a picture-element. However, this is not intended to limit the meaning of the term "picture-element" which refers to a unit of the composition of an image.

In what follows, the description is directed at the data processing of an arbitrarily chosen picture element, generally referred to herein as element 20. It is to be understood that various embodiments of the invention are applied independently for most or all the picture elements of the image.

Figure 2:
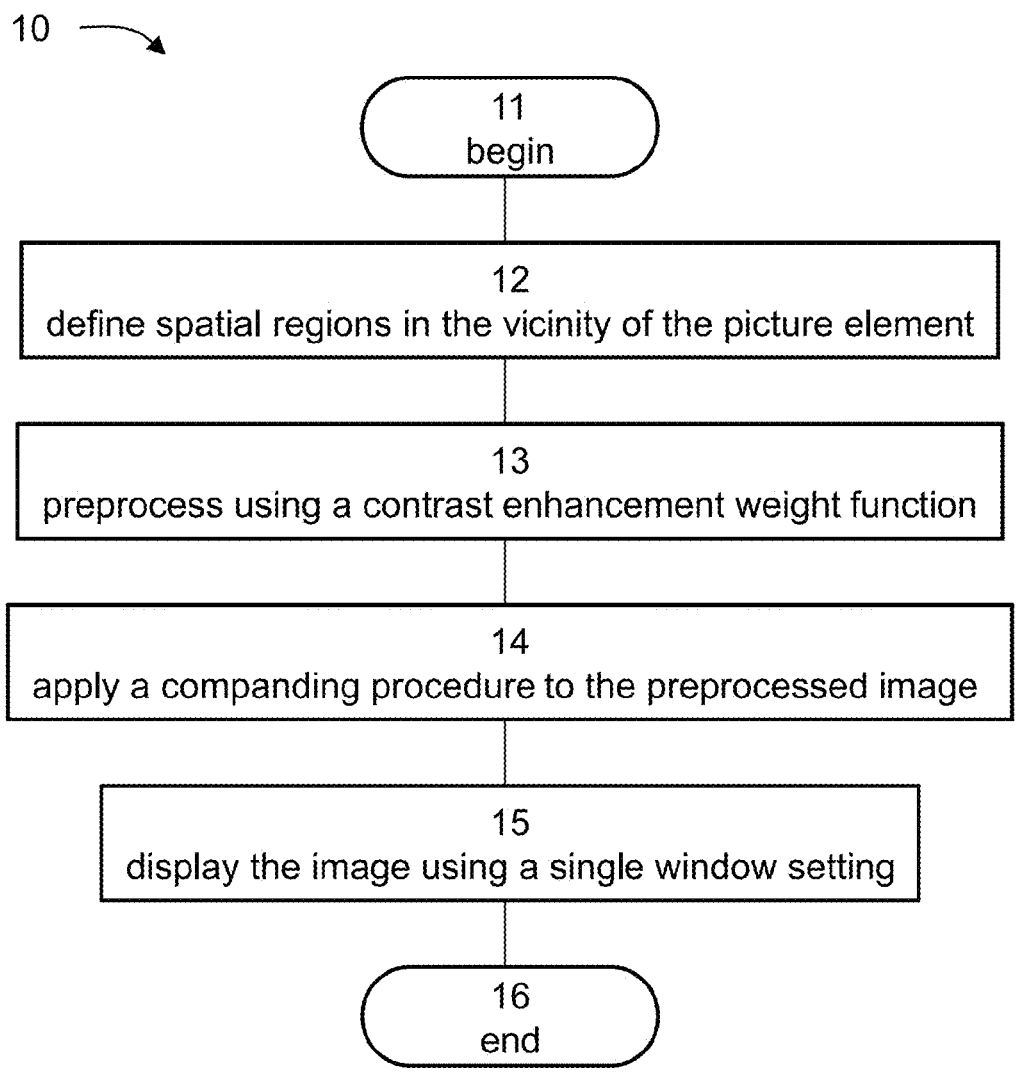

Reference is now made to FIG. 2 which is a flowchart diagram describing a method 10 suitable for processing a computerized tomography image, according to various exemplary embodiments of the present invention.

It is to be understood that, unless otherwise defined, the phases of the method described hereinbelow can be executed either contemporaneously or sequentially in many combinations or orders of execution. Specifically, the ordering of the flowchart diagram is not to be considered as limiting. For example, two or more operations, appearing in the following description or in the flowchart diagrams in a particular order, can be executed in a different order (e.g., a reverse order) or substantially contemporaneously. Additionally, several operations of the method described below are optional and may not be executed.

The method begins at 14 and optionally and preferably continues to 12 at which several regions in the vicinity of picture-element 20 (but not necessarily adjacent thereto) are defined. In various exemplary embodiments of the invention a surrounding region and a remote region are defined for element 20. In some embodiments, a center region comprises element 20 and picture elements immediately adjacent to element 20, is also defined. Alternatively, the center region may be a single element region, hence comprising only element 20. This alternative, of course, coincide with the embodiment in which no center region is selected.

As further detailed hereinafter, the regions, preferably measured in units of picture elements, are used to simulate the physiological adaptation mechanism of the human visual system.

The concept of the center, surrounding and remote regions may be better understood from the following example, with reference to FIGS. 3A-B. Thus, if the picture elements are arranged in a rectangular grid 30, the center region may be a single picture element (element 20), the surround region may be picture elements 32 surrounding picture elements 20 and the remote region may be picture elements 34, surrounding picture elements 32.

In FIG. 3A, the surround region comprises eight picture-elements immediately surrounding (i.e., adjacent to) element 20, and the remote region comprises 40 picture-element forming the two layers surrounding those eight picture-elements. However, this need not necessarily be the case, since, for some applications, it may be desired to extend the surround region farther from those eight elements which immediately surround element 20. FIG. 3B, for example, illustrates an embodiment in which the surround region comprises 48 picture-element which form the first three layers surrounding element 20, and the remote region comprises 176 picture-element which form the four layers surrounding those 48 elements. Also contemplated are embodiments in which the center region comprises more picture-element, e.g., an arrangement of 2×2 or 3×3 picture-elements. Other definitions for the center, surrounding and remote regions are not excluded from the present invention, both for a rectangular grid or for any other arrangement according to which the picture elements of the CT image are inputted.

Once the surround and optimally the remote and/or center regions are defined, the intensities of the picture elements in each region are preferably used for calculating, for each region, an overall regional intensity, $G_r$, where the subscript "r" is to be understood as a regional subscript. Specifically, for the center region r should be replaced by the subscript "center", for the surrounding region r should be replaced by the subscript "surround" and for the remote region r should be replaced by the subscript "remote".

According to a preferred embodiment of the present invention the overall intensity may be calculated using a regional spatial profile, $f_r$. More preferably, the overall intensity is calculated as an inner product of the intensity of the picture elements in each region with the respective regional spatial profile. Mathematically this inner product is realized by the following equation:

$$G_r = \int I * f_r ds \quad \text{(EQ. 1)}$$

where the integration is to be understood as convolution, and where ds is an area integration measure, which is selected in accordance with the arrangement of the inputted picture elements, e.g., for a rectangular x-y grid-like arrangement ds equals dx dy. The regional spatial profiles, $f_r$, used for calculating the overall regional intensities are preferably spatial decaying functions, with may have different forms, depending on the region in which the profiles are applied. Examples for the specific form of each regional spatial profile include, but are not limited to, a Gaussian, an exponent, a Lorenzian, a modified Bessel function and a power-decaying function. These function are typically characterized by a slope, denoted $K_r$ (r="center", "surround", "remote"), which may be different for each region.

The integration of Equation 1 spans over the respective region as defined at 12. Typically, but not necessarily, for the overall center intensity, $G_{center}$, the integration spans over a single picture element (element 20). For example, when a picture-element is a pixel, $G_{center}$ can equal the intensity level associated with this pixel. For the overall surround intensity $G_{surround}$, the integration can extend over a radius of 3 picture-elements, not including element 20, and for the overall remote intensity, $G_{remote}$, the integration area can extend over an annulus having an inner radius of 3 picture-elements and an outer radius of 7 picture-elements (see, e.g., FIG. 3B). At the boundaries of the images, all the integrations preferably facilitate periodic boundary conditions.

Referring now again to FIG. 2, the method proceeds to 13 at which the CT image is preprocessed using a contrast enhancement weight function W, thereby providing a preprocessed image. In various exemplary embodiments of the invention this operation enhances the low contrast of soft tissues. The intensity levels of soft tissues is typically relatively narrow (from about −200 HU to about +300 HU), compared to the dynamic range of the entire CT slice (from about −1000 HU to about 3000 HU). Enhancement of soft tissue contrast can be obtained by a thresholding procedure employing a predetermined HU value, V.

In some embodiments of the present invention the contrast enhancement weight function W has a quadratic dependence on the intensity I, of picture-element 20, e.g., $$W(x, y) = \begin{cases} \dfrac{4c_1(I(x,y) - V) \cdot (I_{max} - I(x,y))}{(I_{max} - V)^2} & \text{if } I(x, y) \geq V \\ \dfrac{-4c_2(V - I(x,y)) \cdot I(x,y)}{3V^2} & \text{if } I(x, y) < V, \end{cases} \quad \text{(EQ. 2)}$$

where (x, y) are the coordinates of element 20 (in a Cartesian coordinate system), $I_{max}$ is the maximal value of I over the CT image, and $c_1$ and $c_2$ are predetermined constants.

Typically, V is selected between the characteristic intensity value of the soft tissue and the characteristic intensity value of bone tissue, preferably closer to the characteristic intensity range of the liver, $c_1$ is selected such that the local maximum of W as a function of I is between about 1000 HU and about 1500 HU, and $c_2$ is selected such that the local minimum of W as a function of I is between about −1500 HU and about −1000 HU. A typical value for V is from about 1200 to about 1400, a typical value for $c_1$ is from about 1200 to about 1400 and a typical value for $c_2$ is from about 3600 to about 4200. FIG. 4A shows a graph of the contrast enhancement weight function W as a function of the intensity I, for V=1280 (vertical line in FIG. 4A), $c_1$=1300 and $c_2$=3900.

Once W(x,y) is calculated, the intensity value I(x,y) of element 20 is updated using the value of W(x,y). In various exemplary embodiments of the invention the method calculates a selective contribution δI(x,y) using W(x,y) and adds the selective contribution to I(x,y). This operation can be formulated mathematically, as:

$$I(x,y) \rightarrow I(x,y) + \delta I(x,y) \quad \text{(EQ. 3)}$$

In some embodiments, δI(x,y) is obtained by multiplying W(x,y) by a local weight. In embodiments in which a surround region is defined, the local weight can be obtained from $G_{surround}$, as calculated from Equation 1 with respect to the surrounding region associated with element 20. In embodiments in which a remote region is defined, the local weight can be obtained from $G_{remote}$, as calculated from Equation 1 with respect to the remote region associated with element 20. The local weight can equal $G_r/\max(G_r)$, where "r"="surround" or "remote", and $\max(G_r)$ is the maximal value of $G_r$ over the CT image to ensure that the local weight is between 0 and 1. In this embodiment, δI(x,y) is given by:

$$\delta I(x,y) = W(x,y) G_r / \max(G_r) \quad \text{(EQ. 4)}$$

The rationale behind this procedure is illustrated in FIG. 4B. When the region in the vicinity of element 20 (the surrounding or remote region) is dark, $G_r/\max(G_r) \ll 1$ and W is multiplied by a relatively small number. In this case the value of δI is relatively small and there is only a small or no change in the value of the intensity of element 20. On the other hand, when the region in the vicinity of element 20 is bright, $G_r/\max(G_r)$ is more close to 1 and the absolute value of δI is not small: for low intensity of element 20 (I<V) W, hence also a, is negative and I is decreased; for high intensity of element 20 (I≥V) W, hence also δI, are positive and I is increased. Thus, the contrast enhancement weight function provides contrast enhancement due to global intensities ($I_{max}$ and V), and the local weight provides contrast enhancement due to intensities in the vicinity of the picture-element being preprocessed.

One example for the advantage of this rationale is a chest CT image. In chest CT images there are blood vessels which are surrounded by the air present in the lung tissue. The present embodiments maintain appearance of the blood vessels in the lung tissue, because the intensity of the picture-elements associated with blood vessels is not reduced more than the intensity of the picture-elements associated with air. For example, the value of δI for picture-element associated with blood vessels in the lungs can be relatively small or zero. Thus, the intensity of those picture-elements is maintained and the contrast between them and the picture-element associated with air is preserved.

The above preprocessing is preferably repeated so as to update the intensity of all the picture elements of the CT image. Thus, a preprocessed image in which the intensity of each picture-element is updated, preferably according to Equations 2-3, is obtained.

Typically, there is an overlap between the narrow range of characteristic intensities for the liver tissue and wide range of characteristic intensities for the bones tissue. In some embodiments of the present invention a further pre-processing is performed so as to enhance contrast for picture-elements associated with the liver tissue, while preventing over-enhancement for picture-elements associated with the bone marrow tissue. This further pre-processing can be done by performing convolutions between the image (after the addition of the selective contribution δI) and N types of regional spatial profiles and using these convolutions for redefine the image. In some embodiments of the present invention two new images $L_{max}$ and $L_{min}$ are defined as follows:

$$L_{max} = \max\{I*f_i\}_{i=1,\ldots,N}, \text{ and}$$

$$L_{min} = \min\{I*f_i\}_{i=i=1,\ldots,N}.$$

Once $L_{max}$ and $L_{min}$ are defined, the CT image can be redefined as follows:

$$I \rightarrow C \cdot I - (L_{max} - L_{min}).$$

The dynamic range of the preprocessed image, however, is still similar to the original dynamic range of the original CT image. Thus, in various exemplary embodiments of the invention the method continues to 14 at which a companding procedure is applied to the preprocessed image so as to reduce the dynamic range to a second dynamic range which is displayable on a display device. The companding can be according to any companding procedure known in the art. Representative examples include the companding procedure described in U.S. Published Application No. 20040165086, International Patent Publication No. WO2004/075535 and U.S. Application No. 61/008,309, the contents of which are hereby incorporated by reference. Also contemplated is the companding procedures disclosed in Yuanzhen et al. "Compressing and companding high dynamic range images with subband architectures," International Conference on Computer Graphics and Interactive Techniques Proceedings of ACM SIGGRAPH 2005 (2005) pages 836-844, and Duan et al., "Comprehensive Fast Tone Mapping for High Dynamic Range Image Visualization," Proceedings of Pacific Graphics (2005). Also contemplated are combinations of the techniques disclosed in two or more of the above documents. A preferred companding procedure is described hereinunder.

Optionally and preferably the method continues to 15 at which the processed CT image is displayed on display device using a single window setting selected in accordance with the second dynamic range.

As used herein "single window setting" refers to a setting in which the CT image is displayed such that picture-elements representing tissues characterized by substantially different attenuation coefficients are displayed on the same window and using the same grey-scale. For example, a grey-scale of 0-255 can be used to simultaneously display both picture-elements representing the lungs and picture-elements representing the bones. Preferably, the single window setting of the present embodiments is such that picture-elements representing tissues characterized by any attenuation coefficients from about −1000 HU to about 2000 HU, more preferably from about −1000 HU to about 2500 HU, more preferably from about −1000 HU to about 3000 HU, are simultaneously displayed on the same window and using the same grey-scale.

The method ends at 16.

Reference is now made to FIG. 5 which is a flowchart diagram describing a companding procedure 100, according to various exemplary embodiments of the present invention. One or more of the operations of companding procedure 100 can be used in phase 14 of the method described above. The description is directed at the processing of element 20, but various embodiments are applied independently for most or all the picture elements of the image.

It is to be understood that, unless otherwise defined, the phases of the companding procedure described hereinbelow can be executed either contemporaneously or sequentially in many combinations or orders of execution. Specifically, the ordering of the flowchart diagram is not to be considered as limiting. For example, two or more operations, appearing in the following description or in the flowchart diagrams in a particular order, can be executed in a different order (e.g., a reverse order) or substantially contemporaneously. Additionally, several operations of the companding procedure described below are optional and may not be executed.

The procedure begins at 101 and optionally continues to 102 at several regions in the vicinity of picture-element 20 (but not necessarily adjacent thereto) are defined. This operation is similar to the operation described above with respect to block 12 of method 10, and is therefore optional. Specifically, it is not necessarily to define the regions twice. Thus, when 12 is already executed by method 10, it is not required to execute 102. 102 can also be partially executed. For example, when method 10 only defines the surround region and it is desired to define more regions.

The procedure continues to 103 at which one or more adaptation terms are calculated using intensity levels of each picture element of the surrounding and remote regions. These adaptation terms are denoted herein as $\sigma_r$, where r is a regional index, r, as described above. In various exemplary embodiments of the invention two adaptation terms are defined, $\sigma_{center}$ and $\sigma_{surround}$.

Each of the adaptation terms $\sigma_{center}$ and $\sigma_{surround}$ preferably comprises a local part and a remote part, to account for the influence of the remote region:

$$\sigma_r = \sigma_{r,local} + \sigma_{r,remote}, \quad \text{(EQ. 5)}$$

where "r"="center" or "surround". $\sigma_{center,local}$ is preferably a function of the overall center intensity $G_{center}$, and $\sigma_{center,remote}$ is preferably a function of overall remote intensity $G_{remote}$. Similarly, $\sigma_{surround,local}$ is preferably a function of the overall surround intensity $G_{surround}$, and $\sigma_{surround,remote}$ is preferably a function of overall remote intensity $G_{remote}$. The local parts and the remote parts of the center and surround adaptation terms determine the relative weight of the remote region on each adaptation term.

The local parts of $\sigma_{center}$ and $\sigma_{surround}$ are preferably calculated as linear functions of the regional overall intensities (with either constant or variable coefficients).

$$\sigma_{r,local} = \alpha_r G_r + \beta_r, \quad (EQ.\ 6)$$

The value of the coefficients $\alpha_r$ and $\beta_r$ ("r"="center" or "surround") may be selected in accordance with the dynamic range of the CT image. It was found by the present inventors that for companding a typical CT image a value between 0.1 and 1.0 can be used for both $\alpha_r$ and $\beta_r$, but it is not intended to limit the scope of the present invention to any particular choice of $\alpha_r$ and $\beta_r$. In some embodiments of the present invention the values of $\alpha_r$ and $\beta_r$ are substantially higher than 1. For example, $\alpha_r$ can be about 50, and $\beta_r$ can be about 100 for the center adaptation term and about 150 for the surround adaptation term. The choice of $\alpha_r$ and $\beta_r$ may depend on the formalism for calculating the remote adaptation terms as further demonstrated in the Examples section that follows.

The coefficient $\beta_r$ generally controls the amount of adaptation which is performed by the adaptation terms. More specifically, as can be understood by inspecting Equation 6, $\beta_r$ functions as an adaptation threshold, where for large values of $\beta_r$, the adaptation level is low and for low values of $\beta_r$, the adaptation level is high. The amount of the required adaptation can also depend on the intensity at a particular picture element or on the intensity of a group of picture elements, e.g., the picture elements populating the remote region or more. Thus, in these embodiments $\beta_r$ is a function rather than a constant coefficient. According to some of these embodiments, $\beta_r$ is an increasing function of the intensity, so that for low intensity regions the amount of adaptation is high and for high intensity regions the amount of adaptation is low.

Although the coefficients of Equation 6 are mathematical coefficients, they are preferably based on electro-physiological findings. In accordance with the above physiological "gain control", each of the center and surround adaptation term independently characterizes a dynamical intensity curve. The coefficients $\alpha_r$ are thus determine the degree of curve-shifting, for example, higher values of $\alpha_r$ lead to higher shifting amount of the response curve. The combination between $\alpha_r$ and $\beta_r$ determine the onset of the gain-control mechanism, hence $\alpha_r$ and $\beta_r$ serve as gain thresholds.

The remote parts of $\sigma_{center}$ and $\sigma_{surround}$ can be calculated using one or more adaptation weights denoted $RM_r$ ("r"="center" or "surround"):

$$\sigma_{r,remote} = RM_r G_{remote}. \quad (EQ.\ 7)$$

Generally, $RM_r$ can be a constant or it can vary with one or more of the regional intensities. In some embodiments of the present invention the same adaptation weight $RM_r$ is used for the calculation of the remote parts of both $\sigma_{center}$ and $\sigma_{surround}$, and in some embodiments of the present invention the adaptation weight used for the calculation of the remote part of $\sigma_{center}$ differ from that used for the calculation of the remote part of $\sigma_{surround}$. For example, in some embodiments the adaptation weight used for the calculation of the remote part of $\sigma_{center}$ is a function of one or more of the regional intensities and the adaptation weight used for the calculation of the remote part of $\sigma_{surround}$ is a constant.

As can be seen form Equation 7, the remote parts of $\sigma_{center}$ and $\sigma_{surround}$ are defined as a multiplication between the adaptation weight and the overall remote intensity. The adaptation weights modulate the adaptation in accordance with the intensity levels of picture elements in the remote region. A particular feature of the adaptation weights is that these functions serve also for preserving and/or improving the contrast of the image, in a manner that will be now described.

At the vicinity of element 20, a local-contrast can be defined as the difference between the intensity level of element 20 and the picture elements of the surrounding region, where a large difference is interpreted as a higher local-contrast and a low difference is interpreted as a lower local-contrast. This difference may be calculated by more than one way, for example, by subtraction, division, subtraction of logarithms, discrete differentiation, discrete logarithmic differentiation or any other suitable mathematical operation between intensity levels. The adaptation weights can be functions which are selected in accordance with the local-contrast calculations. Specifically, in regions in which the local-contrast is high these functions have small numerical values and in regions in which the local-contrast is low these functions have higher numerical values.

When the adaptation weight $RM_r$ is a function, it can be defined in more than one way.

In some embodiments, $RM_r$ is calculated using the following expression:

$$RM_r = c_r(I_{max} - |G_{center} - G_{surround}|), \quad (EQ.\ 8)$$

where $c_r$ ("r"="center" or "surround") is a constant selected in accordance with the dynamic range of the CT image. It was found by the present inventors that a value between 1.0 and 4.0 for $c_r$ is suitable for companding a typical CT image, but it is not intended to limit the scope of the present invention to any particular choice of $c_r$.

In some embodiments, $RM_r$ is calculated using the following expression:

$$RM_r = c_r(I_{max} - |G_{center} - G_{surround}|)EF(I), \quad (EQ.\ 9)$$

where $c_r$ is a constant as described above and EF is a selective enhancement function. In various exemplary embodiments of the invention the value of EF is higher for characteristic intensities of lung tissue than for characteristic intensities of liver tissue. In various exemplary embodiments of the invention the rate of change of EF (as a function of I) is higher for the characteristic intensities of soft tissue than for the characteristic intensities of liver tissue and lung tissue.

A representative example of the function EF, according to some embodiments of the present invention is:

$$EF(I) = D \cdot (\max(I_{avg}) - I_{avg}) \quad (EQ.\ 10)$$

where $I_{avg}$ is an average intensity calculated by averaging at least a few of the lung tissue characteristic window function $I_{lung}$, soft tissue characteristic window function $I_{soft}$, liver tissue characteristic window function $I_{liver}$ and bone tissue characteristic window function $I_{bone}$. The averaging can be of any type, including, without limitation, arithmetic average (weighted or equal-weighted), geometric average, harmonic average, root-mean-square, generalized (arbitrary power) root-mean-power and the like. For example, $I_{avg}$ can be calculated using the following expression:

$$I_{avg} = 0.25(I_{lung} + I_{soft} + I_{liver} + I_{bone}). \quad (EQ.\ 11)$$

Each of the characteristic window functions calculates a grey level for a given intensity, for the respective tissue. Typically, the characteristic window functions are linear functions of the intensity.

In various exemplary embodiments of the invention $I_{lung}$, $I_{soft}$, $I_{liver}$ and $I_{bone}$ are characteristic window functions as defined in a conventional linear intensity window setting technique for viewing CT images. A typical example of such linear intensity window setting is shown in FIG. 6A. Shown in FIG. 6A are $I_{lung}$ (blue), $I_{soft}$ (green), $I_{liver}$ (red) and $I_{bone}$ (magenta) as a function of the intensity. Also shown in FIG. 6A is $I_{avg}$ (black) as calculated using Equation 11.

The corresponding selective enhancement function EF(I) is shown in FIG. 6B. As shown, for characteristic intensities of lung tissue (generally I<1000) the value of EF is above 0.8, and for characteristic intensities of liver tissue (generally I>1200) the value of EF is below 0.2. Also, for the characteristic intensities of soft tissue (generally 800<I<1200) the rate of change $\Delta EF/\Delta I$ (in absolute value) is about 0.6/400=0.0015, while for characteristic intensities of liver tissue $\Delta EF/\Delta I$ (in absolute value) is about 0.2/2000=0.0001.

In some embodiments of the present invention the function EF comprises a symmetric function. A representative example of the function EF, according to some of these embodiments is:

$$EF(I) = (D_1 - D_2 \text{Bell}(I*H))(1-s), \quad (EQ. 12)$$

where $D_1$ and $D_2$ are constants, Bell(I*H) is a function of the convolution of the intensity I with a smoothing mask H and s is a global or local correction factor. The Bell function generally has the shape of a Bell and can be given by:

$$\text{Bell}(x) = \frac{1}{1 + \left|\frac{x-C}{A}\right|^{2B}} \quad (EQ. 13)$$

where A, B and C are constant parameters. The Bell function is symmetric about x=C and has a full width at half maximum of 2A. The parameter B is referred to as the slope of the function. Other types of symmetric functions are not excluded from the scope of the present invention.

The smoothing mask H in Equation 12 can be for example, an average filter, e.g., a moving average filter and the like. In some embodiments of the present invention the correcting factor s is a local standard deviation LSD which can be calculated over the center and surround regions, e.g., $$LSD(x, y) = \frac{1}{(2n+1)^2} \sum_{k=x-n}^{x+n} \sum_{l=y-n}^{y+n} [I(k, l) - \bar{I}(x, y)]^2 \quad (EQ. 14)$$

where 2n+1 is the number of picture-element in the center and surround regions (typically n is an integer from about 3 to about 10), and $$\bar{I}(x, y) = \frac{1}{(2n+1)^2} \sum_{k=x-n}^{x+n} \sum_{l=y-n}^{y+n} I(k, l). \quad (EQ. 15)$$

Typical values for $D_1$ and $D_2$ are from about 0.1 to about 2, typical values for A is from about 700 to about 1000, typical values for B are from about 2 to about 10, typical values for C are from about 1500 to about 2000.

In some embodiments, $RM_r$ is calculated at least in part, using a contrast-contrast induction model. The contrast-contrast induction model preferably comprises a local contrast $C_{local}$ and optionally a remote contrast $C_{remote}$. The local contrast $C_{local}$ or part thereof can be calculated by integration of intensities over the center and surround region, and the remote contrast $C_{remote}$ or part thereof can be calculated by integration of the local contrast over the remote region. A preferred procedure for calculating $C_{local}$ and $C_{remote}$ is provided in the Examples section that follows.

Once $C_{local}$ and optionally $C_{remote}$ are calculated, $RM_r$ can be calculated using the following expression:

$$RM_r = c_r(I_{max} - GF), \quad (EQ. 16)$$

where GF is a gain-factor given by Equation 17 or Equation 18, below:

$$GF(x, y) = C_{local}(x, y) + \beta_{cc} \quad (EQ. 17)$$

$$GF(x, y) = \frac{C_{local}(x, y) + \beta_{cc}}{C_{remote}(x, y) + \beta_{cc}}. \quad (EQ. 18)$$

where $\beta_{cc}$ is a predetermined constant that determines the degree of the gain.

A known phenomenon in the field of image-processing is the appearance of halo artifacts, surrounding the imaged objects. The halo artifacts are typically formed near edges of large contrast, and can be explained mathematically as originated from large intensity derivatives at the respective picture elements.

At 104 the procedure reduces or eliminates halo artifacts. This can be done in more than one way.

In some embodiments, the procedure of halo artifacts reduction/elimination can comprise a halo-test, performed so as to determine a possible contribution of the respective picture element to a formation of a halo artifact. According to a preferred embodiment of the present invention, a picture element in which the intensity level is substantially different than the intensity level of element 20 is defined as a contributor to a formation of halo artifact. For example, if the difference between the intensity level of element 20 and intensity level of a particular picture element is above a predetermined threshold, then the particular picture element is defined as contributor to a formation of halo artifact. It is to be understood that any mathematical procedure, other than a difference, between the intensity levels may also be employed in the halo-test.

The halo-test is performed, preferably on each picture-element of the image, more preferably on each picture-element in the regions other than the center region, and most preferably on each picture-element in the remote region.

Once the halo-test is performed, the procedure of eliminating the halo artifacts is executed as follows: let p be a picture element which has been defined in the halo-test as a contributor to a formation of halo artifact. Then, for the purpose of calculating the overall intensity, the intensity level of p is preferably replaced with a new, predetermined, intensity level. The predetermined intensity level is not limited and may be, for example, a constant, a function of the intensity level of element 20, an average intensity level and the like. According to a preferred embodiment of the present invention, once the calculation of the overall regional intensities is completed, the original value of p is restored.

In some embodiments, neighboring picture-elements which are significantly different than element 20 are replaced with the value of element 20, as formulated in the following expression:

$$\tilde{G}_s(m, n) = \begin{cases} G_s(m, n), & h_1 \leq \frac{I(x, y)}{G_s(m, n)} \leq h_2 \\ I(x, y), & \text{otherwise} \end{cases} \quad (EQ. 19)$$

where I(x,y) is the intensity of element 20, $G_s(m,n)$ is the picture-element in position (m,n) located inside the region, $G_s$ and $h_1$ and $h_2$ are predetermined thresholds. Typical values for $h_1$ and $h_2$ are about ⅓ (third) and about 3, respectively.

In some embodiments, high contrast edges are completely removed as described, for example, in Pattanaik et al., Proc. SCCG, 24-27, 2002, the contents of which are hereby incorporated by reference.

In some embodiments the sizes of the center, surrounding and/or remote regions depend on whether a contributor to a formation of halo artifact has been defined in the respective region. More particularly regions with no contributors to a formation of halo artifact are larger than regions in which one or more such contributors were found in the halo-test.

As stated, the regional spatial profiles, $f_r$, used for calculating the overall regional intensities are preferably spatial decaying functions. These function are typically characterized by a slope, denoted $K_r$ (r="center", "surround", "remote"), which may be different for each region.

In some embodiments of the present invention, one or more of the regional spatial profiles, $f_r$, and more preferably the remote spatial profile, is constructed so as to reduce halo-artifacts. This can be done for example by selecting an appropriate width to the profile. Specifically, narrow remote spatial profile is selected when one or more contributors to a formation of halo were detected in the halo-test, and wide remote spatial profile is selected when no such contributor was detected. In other words, large overall intensities correspond to narrow regional spatial profiles and low overall intensities correspond to wide remote spatial profile.

Halo artifacts can also be reduced by a judicious selection of the coefficients $\alpha_r$ and $\beta_r$. It has been found by the inventors of the present invention that the halo-formation phenomenon is more sensitive to the value of $\beta_r$ than to the value of $\alpha_r$. Thus, according to some embodiments of the present invention the value of $\beta_r$ is selected as a function of the relations between the overall intensities, for example, as a function of $G_{remote}-G_{surround}$, or as a function of the $G_{center}-0.5(G_{remote}-G_{surround})$, or any other suitable combination of two or more overall intensities. It is to be understood that it is not intended to limit the scope of the present invention to use only $\beta_r$ for reducing/eliminating halo artifacts. In some embodiments of the present invention $\alpha_r$ may also be a function of the overall intensities.

The present embodiments also contemplate combination of two or more of the above procedures for reducing or eliminating halo artifacts.

At 105 the procedure assigns a new intensity level to element 20 based the adaptation terms. The new intensity level is in a second dynamic range which is smaller than dynamic range of the original CT image. The second dynamic range is preferably displayable on a display device, as further detailed hereinabove.

The assignment of a new intensity level is preferably according to the following equation:

$$R = \frac{G_{center}}{G_{center} + \sigma_{center}} - \frac{G_{surround}}{G_{surround} + \sigma_{surround}}. \quad (EQ. 20)$$

The procedure ends at 106.

Reference is now made to FIG. 7, which is a simplified illustration of an apparatus 70 for processing a CT image, according to various exemplary embodiments of the present invention.

In some embodiments of the present invention apparatus 70 comprises which comprises an input unit 72 for inputting a plurality of picture elements which form the CT image. As further detailed hereinabove, the plurality of picture elements contains intensity values, and includes the arbitrarily chosen element 20, to which the following description refers.

Apparatus 70 comprises a preprocessing unit 74 which preprocesses the inputted image using contrast enhancement weight function. In various exemplary embodiments of the invention unit 74 is configured for executing one or more of the operations of method 10 described above.

Preferably, preprocessing unit comprises, or operatively associated with, a selective contribution calculator 76 which calculates for element 20 a selective contribution δI using a contrast enhancement weight function W, as further detailed hereinabove. In this embodiment, preprocessing unit 74 adds the selective contribution to the intensity of element 20. Units 74 and 76 are preferably configured to perform the above operations for at least a few, preferably all the picture-elements of the CT image.

Apparatus 72 further comprises a companding unit 78 which applies a companding procedure to the preprocessed image, so as to reduce the dynamic range of the image. In various exemplary embodiments of the invention unit 72 is configured for executing one or more of the operations of procedure 100 described above. In some embodiments of the present invention the dynamic range is reduced to a second dynamic range which is displayable on a display device 80, so as to allow displaying the processed computerized tomography image on display device 80 using a single window setting selected in accordance with the second dynamic range, as further detailed hereinabove. In some embodiments of the present invention apparatus 70 comprises display device 80.

Reference is now made to FIG. 8, which is a simplified illustration of a computerized tomography system 90, according to various exemplary embodiments of the present invention. System 90 preferably comprises a computerized tomography scanner 92 which scans a subject using X-ray radiation to provide a CT image having a first dynamic.

It is expected that during the life of this patent many relevant devices for acquiring a CT image will be developed and the scope of the term computerized tomography scanner is intended to include all such new technologies a priori.

System 90 further comprises an image processing apparatus 94 which processes the image, preferably slice by slice, and provides a processed image having a second dynamic range which is smaller than the first dynamic range. In various exemplary embodiments of the invention image processing apparatus 94 comprises apparatus 70. In some embodiments image processing apparatus 94 is apparatus 70.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

Example 1

Some embodiments of the present invention have been utilized for processing CT images. In the present example, the preprocessing was in accordance with Equations 1-4, with V=1280. The local weight was calculated using $G_{remote}$ ("r"="remote" in Equation 4). The center, surround and remote regions were as illustrated in FIG. 3B.

The companding procedure was in accordance with Equations 5-8 and 20. Halo artifacts were reduced using Equation 19 with $h_1=\frac{1}{3}$ and $h_2=3$.

The ability of the method of the present embodiments to present a plurality of tissue types on a single window are demonstrated in FIGS. 9A-14B, where FIGS. 9A, 10A and 11A are CT images as viewed in traditional four-window setting method, and FIGS. 9B, 10B and 11B are the same CT images processes in accordance with the teachings of some embodiments of the present invention, and displayed using a single window setting.

Example 2

Some embodiments of the present invention have been utilized for processing CT images. CT scans were performed with and without injection of contrast medium prior to the scan. In the present example, the preprocessing was in accordance with Equations 1-4, with V=1280. The local weight was calculated using $G_{remote}$ ("r"="remote" in Equation 4). The center, surround and remote regions were as illustrated in FIG. 3B.

The companding procedure was in accordance with Equations 5-7, 9 and 12-15. Halo artifacts were reduced using Equation 19 with $h_1=\frac{1}{3}$ and $h_2=3$. A different set of parameters was determined for CT scans with contrast medium injection and for CT scans without contrast medium injection. The values of the parameters are provided in Table 1.

TABLE 1

| Set 1: scans with contrast medium | | Set 2: scans with contrast medium | |
|---|---|---|---|
| $\alpha_{center} = 50$ | $\alpha_{surround} = 50$ | $\alpha_{center} = 50$ | $\alpha_{surround} = 50$ |
| $\beta_{center} = 100$ | $\beta_{surround} = 150$ | $\beta_{center} = 100$ | $\beta_{surround} = 150$ |
| $c_{center} = 195$ | $c_{surround} = 210$ | $c_{center} = 163$ | $c_{surround} = 175$ |
| $D_1 = 1$ | $D_2 = 1$ | $D_1 = 1.2$ | $D_2 = 1$ |
| A = 800 | B = 5 | A = 900 | B = 5 |
| C = 1700 | V = 1280 | C = 1900 | V = 1400 |

FIG. 12A shows a CT slice as viewed in traditional four-window setting method. The CT slice contains three abnormalities: left lobe infiltrate was observed in the lung window, bone metastasis was observed in the bone window, and liver metastasis was observed in the liver window. Note that the lung abnormality is absent from the bone and liver windows, the bone abnormality is absent from the lung and liver windows and the liver abnormality is absent from the lung and bone windows. FIG. 12B shows the same CT slice after processing in accordance with the teachings of some embodiments of the present invention. The slice is displayed using a single window setting. As shown, all three abnormalities are viewable in a single window.

FIGS. 13A-B demonstrate the effect of the preprocessing phase (Equations 1-4). FIG. 13A shows the original image and FIG. 13B shows the preprocessed image. As shown, the preprocessing improves contrast. In particular, the preprocessing enhances the contrast among the soft tissues. Differences between the fat and muscle tissues which are more pronounced FIG. 13B, in comparison to FIG. 13A. This is also manifested in the spots on the liver that are brighter in FIG. 13B than in FIG. 13A. The preprocessing also emphasizes the fine structures of the bone tissue.

FIGS. 14A-B demonstrate the effect of the local weight on the result of the preprocessing. FIG. 14A shows the preprocessed image in an embodiment in which no local weight was employed (or, equivalently, using a local weight of 1 for all picture-elements), and FIG. 14B shows the preprocessed image in an embodiment in which the local weight was $G_{remote}/\max(G_{remote})$. As shown, blood vessels surrounded by air in the lung tissue are present in FIG. 14B but absent or less pronounced in FIG. 14A.

Figure 15A:
Figure 15B:
Figure 15C:
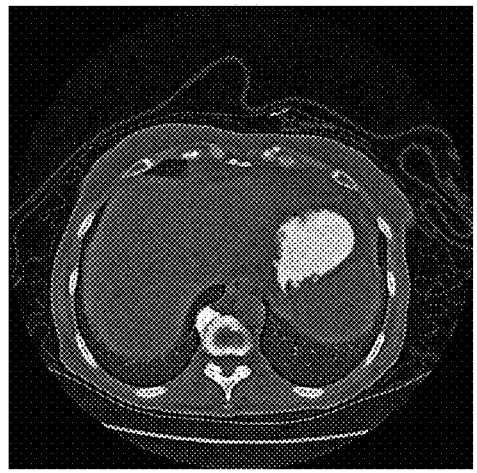
Figure 15D:
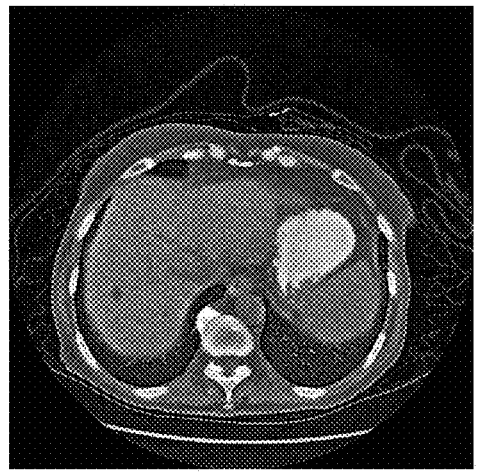

FIGS. 15A-D demonstrate the effect of using different sets of parameters (Table 1) with and without contrast medium injection. The input image for both FIGS. 15A and 15B was a CT slice taken after injection contrast medium. The input image for both FIGS. 15C and 15D was a CT slice taken without contrast medium. FIGS. 15A and 15C show images processed using set 1, and FIGS. 15B and 15D show images processed using set 2. The use of set 1 provided better results with contrast medium and the use of set 2 provided better results without contrast medium.

Example 3

Some embodiments of the present invention have been utilized for processing CT images. In the present example, the preprocessing was in accordance with Equations 1-4, with V=1280. The local weight was calculated using $G_{surround}$ ("r"="surround" in Equation 4). The center, surround and remote regions were as illustrated in FIG. 3B.

The companding procedure was in accordance with Equations 5-7, 9-11, using the selective enhancement function shown in FIG. 6B. Halo artifacts were reduced using Equation 19 with $h_1=\frac{1}{3}$ and $h_2=3$. The values of the parameters used in the preprocessing and companding are provided in Table 2.

TABLE 2

| $\alpha_{center} = 0.7$ | $\alpha_{surround} = 0.7$ |
| $\beta_{center} = 0.2$ | $\beta_{surround} = 0.4$ |
| $c_{center} = 2$ | $c_{surround} = 2.4$ |
| D = 1 | V = 1280 |

FIG. 16A shows a CT slice of the upper abdomen, at the level of the lung bases and the dome of the liver as viewed in traditional four-window setting method. The CT slice contains four abnormalities: lung infiltrate was observed in the lung window (marked by arrow #1), low density liver lesions were observed in the liver window (marked by arrow #2), and an osteoblastic and osteopenic lesions were observed in the bone window (marked by arrows #3 and #4, respectively). Note that the lung abnormality is absent from the bone and liver windows, the bone abnormalities are absent from the lung and liver windows and the liver abnormality is absent from the lung and bone windows. FIG. 16B shows the same CT slice after processing using the parameters presented in Table 2 and in accordance with the teachings of some embodiments of the present invention. The slice is displayed using a single window setting. As shown, all four abnormalities are viewable in a single window.

FIG. 17A shows a CT slice of the upper abdomen, at the level of the lung bases and the dome of the liver as viewed in traditional four-window setting method. The CT slice contains three abnormalities: emphysematous areas and a pulmonary bled were observed in the lung window (marked by arrows #1, and #2, respectively), and a bone cyst was observed in the bone window (marked by arrow #3). Note that the lung abnormalities are absent from the bone window, and the bone abnormality is absent from the lung window. FIG. 17B shows the same CT slice after processing using the parameters presented in Table 2 and in accordance with the teachings of some embodiments of the present invention. The slice is displayed using a single window setting. As shown, all three abnormalities are viewable in a single window.

FIG. 18A shows a CT scan through the pelvis as viewed in traditional four-window setting method (lung window, soft tissue window, narrow window and bone window). Sclerotic changes in the sacroiliac joints, more prominent on the left are best observed in the bone window (see arrow #1). FIG. 18B shows the same CT slice after processing using the parameters presented in Table 2 and in accordance with the teachings of some embodiments of the present invention. The slice is displayed using a single window setting. As shown, all information, including the sclerotic changes in the sacroiliac joints and all types of tissues is viewable in a single window.

FIGS. 19A-B demonstrate the effect of the preprocessing phase (Equations 1-4). FIG. 19A shows the original image and FIG. 19B shows the preprocessed image. As shown, the preprocessing improves contrast. In particular, the preprocessing enhances the contrast among the soft tissues. Differences between the fat and muscle tissues which are more pronounced FIG. 19B, in comparison to FIG. 19A. This is also manifested in the spots on the liver that are brighter in FIG. 19B than in FIG. 19A. The preprocessing also emphasizes the fine structures of the bone tissue.

FIGS. 20A-B demonstrate the effect of the local weight on the result of the preprocessing. FIG. 20A shows a preprocessed image in an embodiment in which no local weight was employed (or, equivalently, using a local weight of 1 for all picture-elements), and FIG. 20B shows a preprocessed image in an embodiment in which the local weight was $G_{surround}/\max(G_{surround})$. As shown, blood vessels surrounded by air in the lung tissue are present in FIG. 20B but absent or less pronounced in FIG. 20A.

Figure 21A:
Figure 21B:
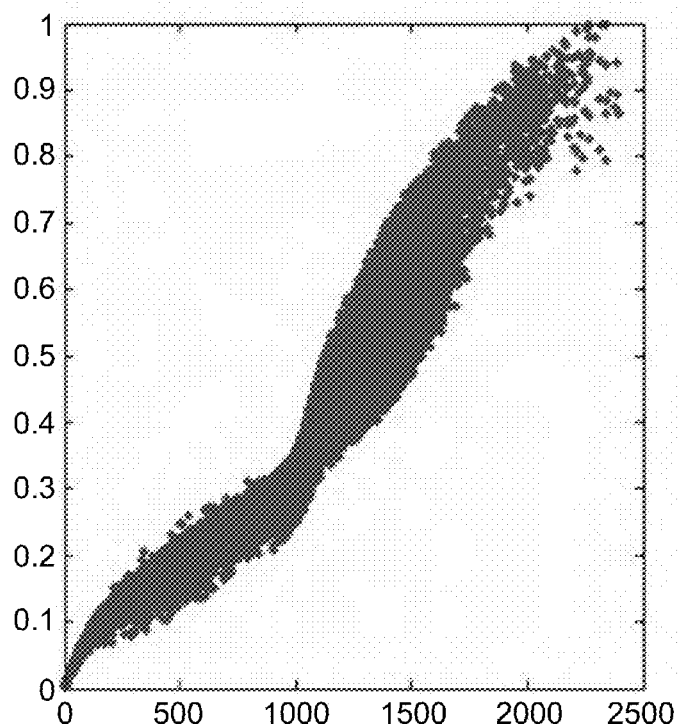
Figure 21C:
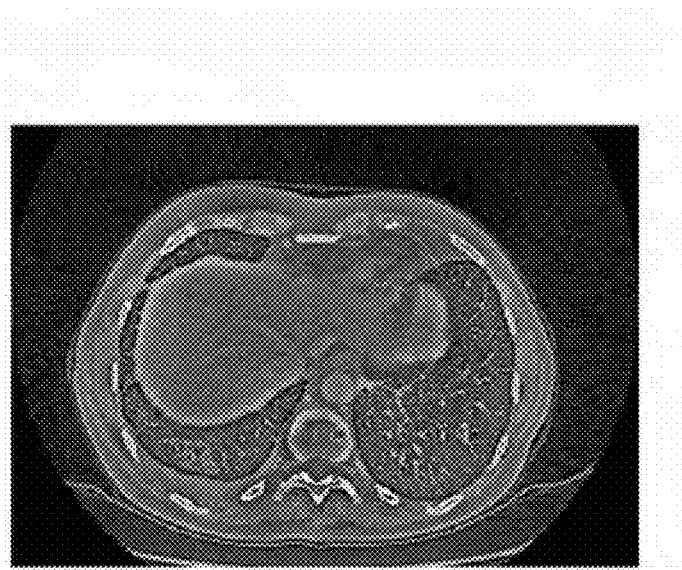
Figure 21D:
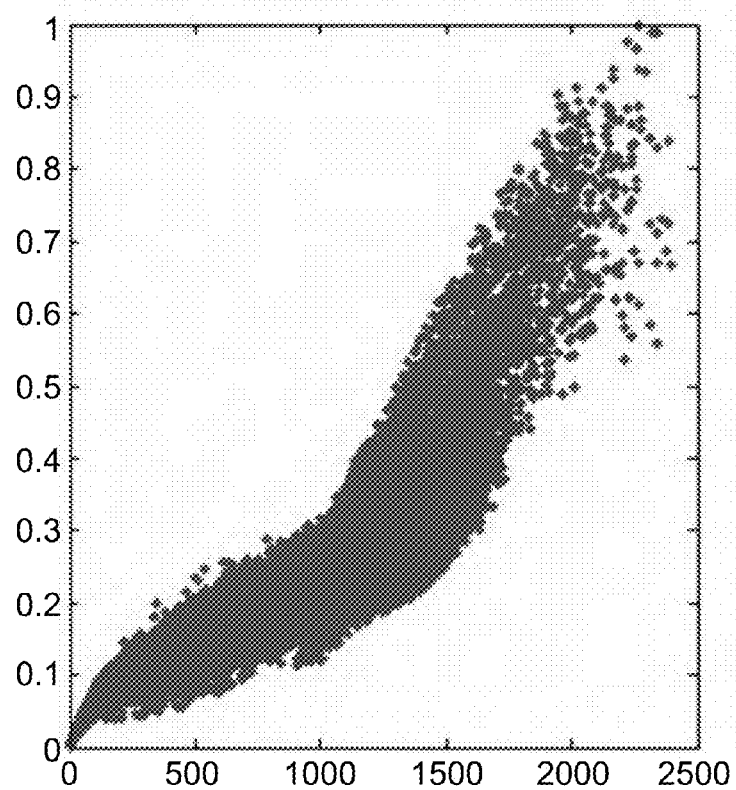
Figure 21E:
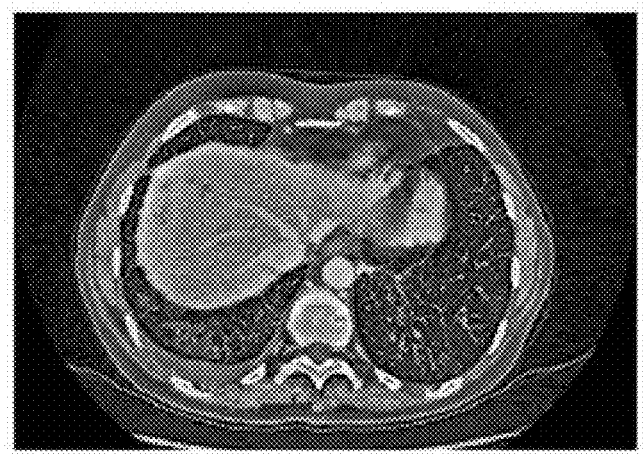
Figure 21F:
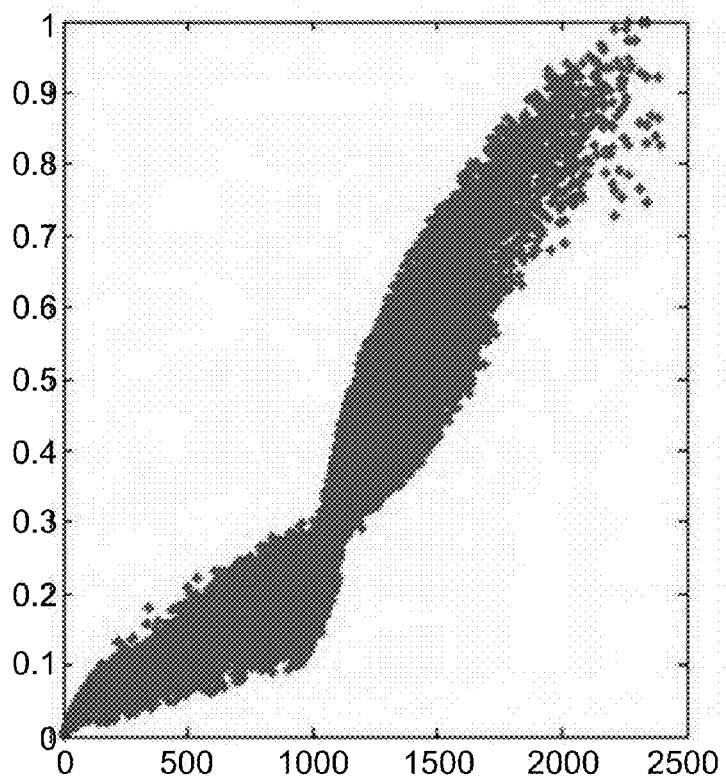

FIGS. 21A-F demonstrate the effect of the selective enhancement function EF. FIGS. 21A-B show a processed image (FIG. 21A) and a response R vs. intensity curves (FIG. 21B), in an embodiment in which EF=1, FIGS. 21C-D show a processed image (FIG. 21C) and a response R vs. intensity curves (FIG. 21D), in an embodiment in which EF=3, and FIGS. 21E-F show a processed image (FIG. 21E) and a response R vs. intensity curves (FIG. 21F), in an embodiment in which EF was calculated according to Equations 10-11. The contrast in the soft tissue in FIGS. 21A-B and 21C-D is low. The use of selective enhancement function (FIGS. 21E-F) significantly enhances the contrast.

Example 4

This example describes a contrast-contrast induction model in accordance with some embodiments of the present invention. The contrast-contrast model described below can be used for calculating the remote adaptation weight $RM_r$.

The contrast-contrast induction model was successfully applied for calculating brightness assimilation effects. The effects of brightness or chromatic assimilation and contrast induction are both dependant on the contextual inducing of the light or surfaces. Brightness induction and assimilation effects have been regarded in the literature as two conflicting brightness effects. The brightness induction effect, also known as first-order induction, exhibits an appearance of a shift in brightness away from the brightness of the surrounding surface, whereas the assimilation effect exhibits a perceived shift towards the brightness of adjacent surround surfaces. An additional induction effect is the contrast-contrast induction which is the effect of modulating the perceived contrast of a central area due to the contrast of its surrounding area [Olzak, L. A., & Laurinen, P. I. (1999), Multiple gain control processes in contrast-contrast phenomena, Vision Res, 39(24), 3983-3987; Singer, B., & D'Zmura, M. (1999), Contrast gain control. In K. R. Gegenfurtner & L. T. Sharpe (Eds.), Color Vision from genes to perception (pp. 369-385): Cambridge university press; Xing, J., & Heeger, D. J. (2001), Measurement and modeling of center-surround suppression and enhancement, Vision Res, 41(5), 571-583].

One such assimilation effect is the so-called "White's effect" shown in FIG. 22. The gray lines in FIG. 22 that are located on the black strips appear much brighter than gray lines located as part of the white strips, even though they are identical. The White's effect typically occurs only when luminance of the test regions lies between the minimum and maximum luminance regions. An opposite effect known as the "inverted White's effect" occurs when the luminance of the test regions lies outside the luminance range of the surrounding strips. This effect is shown in FIG. 31 below. Other types of stimuli, such as the so-called "Stuart's Rings" and achromatic rings patterns, also posses assimilation effects.

The present embodiments successfully provide a model for predicting assimilation and/or inverted assimilation.

Generally, the present embodiments mimic a post retinal mechanism for performing a second order achromatic induction by employing a procedure referred to herein as a second order adaptation.

The second order adaptation procedure is preferably as follows. Firstly, the procedure mimics the transformation of a visual stimulus into a response of post retinal second order opponent receptive fields (SORF's). These SORF's may refer to cortical levels even though the receptive fields are not necessarily oriented. These SORF's have various spatial resolutions, in compliance with the diversity found in the human visual system. Secondly, local and remote contrasts are calculated based on the multi scale SORF responses, and thirdly a contrast-contrast induction is employed. The contrast-contrast induction serves as a contrast gain control and is expressed by the adapted responses of the SORF cells.

The SORF cells receive their input from the retinal ganglion cells through several processing layers. The retinal ganglion cells perform a (first order) adaptation and the SORF cells receive their responses after the adaptation. In the following description, the first order adaptation is not modeled for clarity of presentation, but the skilled artisan, provided with the information described herein would know how to employ first order adaptation, e.g., using the formalism of center and surround adaptation terms described above and/or the first order adaptation described in Spitzer and Barkan (2005), "Computational adaptation model and its predictions for color induction of first and second orders,", Vision Res, 45(27), 3323-3342.

The SORF cells have an opponent type receptive field with a center-surround spatial structure similarly to the structure described above. The receptive field input can be taken from signals of photoreceptors or from retinal opponent cells responses. When a first order adaptation is not modeled, the input is preferably taken from signals of photoreceptors. The spatial response profile of the center region and the surrounding region of the SORF, can be expressed, for example, using difference-of-Gaussians (DOG).

In the present example, the center signals that feed the SORF are defined as an integral of the photoreceptors quantum catches over the center region, with a decaying spatial weight function, $f_c(x-x_0, y-y_0)$.

$$L_{cen}^k(x_0, y_0) = \iint_{cen-area} L_{photo\_r}(x, y) \cdot f_c^k(x - x_0, y - y_0) \cdot dx \cdot dy \quad \text{(EQ. 21)}$$

Where the ($x_0$, $y_0$) is the location of the center of the center region, $L_{photo\_r}(x,y)$ is the response of the photoreceptor at location (x,y) and k is an index that represents the specific spatial resolution (for the finest resolution k=1). Without loss of generality, ($x_0$, $y_0$) can be set to (0, 0). In the following description, the reference to $x_0$ and $y_0$ is therefore omitted.

In various exemplary embodiments of the invention $f_c$ is defined as a decaying Gaussian, e.g.:

$$f_c^k(x, y) = \frac{\exp(-x^2 + y^2 / \rho_{cen}^{k2})}{\pi \cdot \rho_{cen}^k}; x, y \in \text{center\_area} \quad \text{(EQ. 22)}$$

where $\rho_{cen}$ represents the radius of the center region. The surround signals can be similarly defined:

$$L_{srnd}^k(x_0, y_0) = \iint_{surround-area} L_{photo\_r}(x, y) \cdot f_s^k(x, y) \cdot dx \cdot dy \quad \text{(EQ. 23)}$$

where $f_s$ is decaying spatial weight function for the surrounding region. In various exemplary embodiments of the invention $f_s$ is defined as a decaying Gaussian, e.g.:

$$f_s^k(x, y) = \frac{\exp(-x^2 + y^2 / \rho_{sur}^{k2})}{\pi \cdot \rho_{sur}^k}; x, y \in \text{surround\_area} \quad \text{(EQ. 24)}$$

where $\rho_{sur}$ (also referred to below as $\rho_{surround}$) represents the radius of the surrounding region. The total weight of $f_c$ and $f_s$ is typically 1.

The response of the SORF $L_{sorf}$ can be calculated by subtraction as follows:

$$L_{sorf}^k = L_{cen}^k - L_{srnd}^k \quad \text{(EQ. 25)}$$

The Calculations of the SORF Response can be alternatively Derived from an achromatic double-opponent receptive field structure, where the center and the surrounding regions contained opponent sub-units described for example, in Spitzer and Barkan supra.

The gain control mechanism of the present embodiments is dependent on zones which are spatially larger than edges which are commonly modeled as classical opponent receptive fields. In these embodiments, a second order local contrast $C_{local}$ and a second order remote contrast $C_{remote}$ are calculated within local and remote regions. The contrast can be calculated by considering a variability of opponent receptive field sizes which represent opponent receptive field with different scales.

In some embodiments of the present invention it is assumed that in the remote area there is higher sensitivity to higher contrasts than to low contrast in the same spatial location. Therefore, the contrast integration across the remote area of the opponent receptive field is not necessarily a linear spatial integration. It is noted that non-linear integration has physiological plausibility.

In some embodiments of the present invention the local contrast calculation is performed by calculating a local smoothing absolute response for each resolution and by summing these responses:

$$C_{local}(x, y) = \sum_{k=\text{all scales}} \frac{\iint_{local-area} |L_{sorf}^k(x, y)| \cdot W^k(x, y) \cdot dx \cdot dy}{\iint_{local-area} W^k(x, y) \cdot dx \cdot dy} \quad \text{(EQ. 26)}$$

where $W^k$ is a non-linear spatial weight function which can be defined as follows:

$$W^k(x, y) = |L_{sorf}^k(x, y)| \cdot \exp\left(-\frac{x^2 + y^2}{\rho_{local}^2}\right) \quad \text{(EQ. 27)}$$

The use of absolute signals, according to some embodiments of the present invention, enables the procedure to relate to the achromatic SORF responses as a contrast quantifier. Due to the nature of opponent signals (Equation 25) which perform edge detection at different resolutions, they yield a signal only at locations adjacent to edges. Thus, a common local averaging of such signals, would lead to an erroneous low value of average contrast as it would always consider low values that derive from locations that are not adjacent to edges. Thus, in this local area, the weight function is preferably higher for higher SORF when calculating their contribution to the local contrast.

The second order remote contrast $C_{remote}$ represents a peripheral area that extends beyond the borders of the opponent classical receptive field. The remote region typically has an annulus-like shape around the entire receptive field region. In various exemplary embodiments of the invention $C_{remote}$ is calculated as the average contrast in the remote region. The remote signal can be defined as an inner product of the local contrast $C_{local}$ at each location of the remote area with a non-linear decaying weight function $W_c$ (or as a convolution for all spatial locations).

$$C_{remote}(x, y) = \frac{\iint_{remote-area} |C_{local}(x, y)| \cdot W_c(x, y) \cdot dx \cdot dy}{\iint_{remote-area} W_c(x, y) \cdot dx \cdot dy}. \quad \text{(EQ. 28)}$$

$W_c$ preferably obtains higher values for higher local contrast values. In various exemplary embodiments of the invention is a Gaussian function, e.g., $$W_c(x, y) = C_{local}(x, y) \cdot \exp\left(-\frac{x^2 + y^2}{\rho_{remote}^2}\right). \quad \text{(EQ. 29)}$$

where $\rho_{remote}$ represents the radius of the surrounding remote region. In various exemplary embodiments of the invention the result of the second order adaptation is expressed as a gain control mechanism using a local gain factor GF. In some embodiments of the present invention GF is defined as:

$$GF(x, y) = \frac{C_{local}(x, y) + \beta_{cc}}{C_{remote}(x, y) + \beta_{cc}}, \quad \text{(EQ. 30a)}$$

and in some embodiments of the present invention GF is defined as:

$$GF(x,y) = C_{local} + \beta_{cc} \quad (EQ. 30b)$$

where $\beta_{cc}$ is a constant that determines the degree of the gain. The response of each SORF cell after adaptation is therefore:

$$L_{sorf\text{-}adapted}^k(x,y) = GF(x,y) \cdot L_{sorf}^k. \quad (EQ. 31)$$

These SORF responses are the result of the adaptation and can be used by higher visual stages as inputs for further processing. $L_{sorf\text{-}adapted}$ thus represents a perceived value.

Following is a description of experiments performed in accordance with some embodiments of the present invention for processing White's effect image at a resolution of 300× 400 pixels (FIG. 22). Intermediate model calculations and parameters will be introduced throughout the following description. The same parameters were used for all simulated images.

The center signal represents the response of the central area of each SORF. At the finest resolution (k=1) this central area was simulated as a single pixel. Accordingly, the center size for the finest grid was chosen as 1 pixel, i.e., $L_{cen}$ (Equation 21) was equal to the original image luminance (at each spatial location). For different values of k the center size was chosen as a radius of k pixels. The radius of the surround region (Equation 23 and Equation 24), was chosen as 3 times larger than the radius of the center region. This ratio was applied for all values of k. $L_{sorf}^k$ (Equation 25) was calculated by a convolution of the original luminance values with a filter that represent the subtraction of center and surround contributions, for example for k=1 the convolution kernel was:

$$\begin{pmatrix} -0.1095 & -0.1405 & -0.1095 \\ -0.1405 & 1 & -0.1405 \\ -0.1095 & -0.1405 & -0.1095 \end{pmatrix} \quad (EQ. 32)$$

The SORF response (before adaptation, Equation 25) was tested on the White's effect image and the result for k=1 is presented in FIG. 23. The color at each location in FIG. 23 presents the response magnitude of each opponent receptive field according to the color bar on the right side of FIG. 23. The responses have been obtained only adjacently to the edges, where the background stripes (black and white in the original image, FIG. 22) yield higher gradient response (blue and red striped in FIG. 23), than the responses to the stripes along the location of the "test" stripes (cyan and yellow in FIG. 23).

The calculation of $C_{local}$ (Equation 26) was performed with a $\rho_{local} = 10$ pixels for all resolutions. In order to enable the influence of more distant edges, the cutoff of this calculation was taken in a radius of $5\rho_{local}$. This large spatial range of cutoff was required due to the significant weight given to high contrast values even at distant locations (Equation 27). The resolutions where calculated with k=1, 3, 5 and 7.

The intermediate result of the local contrast $C_{local}$ of the White's effect is demonstrated in FIG. 24, where the contrast degree is presented by the luminance value (grey level bar on the right) at each location. The dark squares present the texture of the regions with gray stripes. FIG. 24 demonstrates the different local contrast regions. The white background represents the high background contrast, while the two gray squares represent the lower contrast squares, derived as a result of regions with the gray stripes. Note that the squares' contrast differ from each other, due to the value of the gray stripe which is not the median value between the values of the white and the black stripes.

The calculation of $C_{remote}$ (Equation 28) was performed with a $\rho_{remote} = 10$ pixels for all resolutions. The cutoff of this calculation was taken in a radius of $15\rho_{remote}$. This chosen remote size is also within the range of the reported electro-physiological findings. The intermediate result of the remote contrast $C_{remote}$ is demonstrated in FIG. 25, where the contrast degree is presented by the luminance value (grey level bar on the right) at each location. As shown, the boarders of the squares vanish in the remora contrast due to the larger spatial weight-function. Note that remote contrast is calculated over the local contrast response (Equation 26).

The $C_{remote}$ signals have a smaller response range than the range of local signals (see FIG. 25), due to the large integration area of the $C_{remote}$ signal. Since the $C_{remote}$ signal calculation in the "test" region includes also the background contrast (the white area in FIG. 25), the result of $C_{remote}$ is an average of the contrasts of both "test" and "background" regions. Consequently, the $C_{remote}$ signal in the "test" area obtains higher values than the local contrast at the same "test" area. In other cases (such as in the inverted White's effect, see FIG. 31 below) the C signal of the "test" area can obtain lower values than the local contrast signal at the same "test" area.

The adapted SORF signals, $L_{sorf\text{-}adapted}$ were then calculated using Equations 30a and 31 with $\beta_{cc} = 0.4$. It was found that a smaller value of $\beta$ causes a stronger contrast-contrast induction.

FIG. 26 shows the adapted SORF absolute responses and the original SORF absolute responses for k=1, along a vertical line located at x=300 (see yellow vertical line in FIG. 7a described below). The adapted SORF absolute responses are shown in red and the original SORF absolute responses are shown in blue. $L_{sorf\text{-}adapted}$ presents the perceived local DOG, Equation 31. Therefore, suppression or facilitation of these responses, in comparison to the original DOG ($L_{OP}$) presents contrast suppression (assimilation effects) or contrast facilitation (inverted assimilation effects) respectively. FIG. 26 demonstrates the contrast suppression in the "test" area, which predicts the assimilation effect.

In order to transform $L_{sorf\text{-}adapted}$ into perceived luminance values $L_{per}$ a further inverse function was employed. Yet, different numerical approaches for the transformation of $L_{sorf\text{-}adapted}$ into perceived luminance values are not excluded from the scope of the present invention. Since the gain factor GF is uniform over all resolutions, it is sufficient to demonstrate the inverse function only through the finest resolution (k=1). For the sake of simplicity and clarity of the calculations the finest resolution was taken as a discrete Laplace operator, which is commonly used as an approximation to DOG function. The finest resolution was, therefore, calculated as a convolution of the original image with a kernel of $$\begin{pmatrix} 0 & -1/4 & 0 \\ -1/4 & 1 & -1/4 \\ 0 & -1/4 & 0 \end{pmatrix}. \quad (EQ. 33)$$

The adapted response $L_{sorf\text{-}adapted}$ was approximated as a convolution of the above kernel (Equation 33) with the perceived luminance $L_{per}$:

$$L_{(sorf\text{-}adapted)}^{k=1}(n,m) \approx L_{per}(n,m) - \tfrac{1}{4} \cdot (L_{per}(n-1,m) + L_{per}(n,m-1) + L_{per}(n+1,m) + L_{per}(n,m+1)) \quad (EQ. 34)$$

where (n, m) represent a location index. An Extraction of $L_{per}$ yields an Iterative function. The ith iteration is given by:

$$L_{per}^{i+1}(n,m) = L_{sorf\text{-}adapted}^{k=1}(n,m) + \tfrac{1}{4} \cdot (L_{per}^i(n-1,m) + L_{per}^i(n,m-1) + L_{per}^i(n+1,m) + L_{per}^i(n,m+1)) \quad (EQ. 35)$$

In the present Example, the first guessed perceived luminance, $L_{per}^{(0)}$ (zero iteration) at the inverse function was chosen as the original image at all locations.

FIGS. 27A-C show $L_{per}$ for I=1, 100 and 1000, respectively. Convergence was observed already at iteration No. 100 (FIG. 27B).

The predictions of the model are shown in FIGS. 28A-43C, for various types of stimuli.

FIGS. 28A-C show results obtained by employing the contrast-contrast model of the present embodiments to the White's effect. FIG. 28A shows the original achromatic image. FIG. 28B shows the image as predicted by the model of the present embodiments. FIG. 28C presents the normalized luminance of the original luminance (blue line) and predicted perceived luminance (red line) along an axis marked by the left arrow in FIG. 28A (upper graph), and along an axis marked by the right arrow in FIG. 28A (lower graph). The predicted perceived luminance (red line in FIG. 28C) is lower than the original luminance (blue line in FIG. 28C) in the test stripes along the axis marked by the right arrow, and vice versa for the perceived luminance along the axis marked by the left arrow.

FIGS. 29A-C show results obtained by employing the contrast-contrast model of the present embodiments to random Stuart's rings [Anstis, S. (2005). White's Effect in color, luminance and motion. In M. R. M. Jenkin & L. R. Harris (Eds.), Seeing spatial form: Oxford University Press]. FIG. 29B shows the image as predicted by the model of the present embodiments. FIG. 29C presents the normalized luminance of the original luminance (blue line) and predicted perceived luminance (red line) along an axis marked by the left arrow in FIG. 29A (upper graph), and along an axis marked by the right arrow in FIG. 29A (lower graph). The predicted perceived luminance (red line in FIG. 29C) is lower than the original luminance (blue line in FIG. 29C) in the test stripes along the axis marked by the right arrow, and vice versa for the perceived luminance along the axis marked by the left arrow.

FIGS. 30A-C show results obtained by employing the contrast-contrast model of the present embodiments to a new "liquefied" image which demonstrates the assimilation effect. FIG. 30B shows the image as predicted by the model of the present embodiments. FIG. 30C presents the normalized luminance of the original luminance (blue line) and predicted perceived luminance (red line) along an axis marked by the left arrow in FIG. 30A (upper graph), and along an axis marked by the right arrow in FIG. 30A (lower graph). The predicted perceived luminance (red line in FIG. 30C) is lower than the original luminance (blue line in FIG. 30C) in the test stripes along the axis marked by the right arrow, and vice versa for the perceived luminance along the axis marked by the left arrow. FIGS. 30A-C demonstrate the generalization of the effects which are not connected to specific periodicity, oriented lines or expected shapes. Similar results were also obtained for an inverted version of the "liquefied" effect (not shown).

FIGS. 31A-C show results obtained by employing the contrast-contrast model of the present embodiments to the inverted White's effect. FIG. 31A shows the original achromatic image. Note that the inverted effect is obtained when the test stimuli luminance is outside the range of the background stripes luminance. In this case, the contrast in the test area is stronger than the contrast in the background stripes. FIG. 31B shows the image predicted by the model. FIG. 31C presents the normalized luminance of the original luminance (blue line) and predicted perceived luminance (red line) along an axes marked by the left arrow in FIG. 31A (upper graph) and along an axes marked by the left arrow in FIG. 31A (lower graph). The predicted perceived luminance (red line) is higher than the original luminance (blue line) in the test stripes along both axes, but higher along the axis marked by the right arrow (where the original contrast is stronger) compared to the test area along the axis marked by the left arrow.

FIGS. 32A-C show results obtained by employing the contrast-contrast model of the present embodiments to the Checkerboard contrast illusion [DeValois and DeValois (1988), Spatial vision, In R. L. DeValois & K. K. DeValois (Eds.), New York: Oxford University Press; and in Gilchrist et al. (1999), "An anchoring theory of lightness perception", Psychol Rev, 106(4), 795-834]. FIG. 32A shows the original achromatic image. FIG. 32B shows the image as predicted by the model of the present embodiments. FIG. 32C presents the normalized luminance of the original luminance (blue line) and predicted perceived luminance (red line) along an axis marked by the left arrow in FIG. 32A (upper graph), and along an axis marked by the right arrow in FIG. 32A (lower graph). The predicted perceived luminance (red line in FIG. 32C) is lower than the original luminance (blue line in FIG. 32C) in the test stripes along the axis marked by the right arrow, and vice versa for the perceived luminance along the axis marked by the left arrow.

FIGS. 33A-C show results obtained by employing the contrast-contrast model of the present embodiments to the White's effect and the inverted White's effect. FIG. 33A shows the original achromatic image. FIG. 33B shows the image as predicted by the model of the present embodiments. FIG. 33C presents the normalized luminance of the original luminance (blue line) and predicted perceived luminance (red line) along axis marked in FIG. 33A by arrows #1, #2, #3 and #4. The specific configuration is such that the effect is manifested on test stimuli that have the same contrast range among the inducing stripes in both classical and inverted variants. The model's predictions show the correct trend for all the test stripes. The capital letters (A1, A2, B1, B2, C1, C2, D1 and D2) in FIGS. 33A and 33C indicate the specific locations in the original stimulus image (FIG. 33A) and in the result curves (FIG. 33C), correspondingly. Note that in the original stimulus (FIG. 33A) identical capital letters refer to equal intensity values.

FIGS. 34A-C show the results regarding to the classical contrast-contrast effect as described in Spitzer and Barkan supra. FIG. 34A shows the original achromatic image. FIG. 34B shows the image as predicted by the model of the present embodiments. FIG. 34C presents the normalized luminance of the original luminance (blue line) and predicted perceived luminance (red line) along an axis passing through the center of the left pane in FIG. 34A (upper graph), and along an axis passing through the center of the right pane of FIG. 34A (lower graph).

FIGS. 35A-C and 36A-C show results obtained by employing the contrast-contrast model of the present embodiments to effect described in Spehar et al. (1996) "Brightness induction from uniform and complex surrounds: a general model", Vision Res, 36(13), 1893-1906. These stimuli present an effect which is yielded from different background contrast levels of texture, but have identical luminance values. FIGS. 35A-C are directed to first and second-order White's configurations, and FIGS. 36A-C are directed to first and second-order White's configurations on dark gray test stimuli. FIGS. 35A and 36A show the original achromatic images. FIGS. 35B and 36B show the images as predicted by the model of the present embodiments. FIGS. 35C and 36C present the normalized luminance of the original luminance (blue line)

and predicted perceived luminance (red line) along axes passing through the centers of the panes as described above.

REFERENCES

Chang D C and W R. Wu, "Image contrast enhancement based on a histogram transformation of local standard deviation," *IEEE Trans. Med. Imag.*, vol. 17, pp. 518-531, August 1998.

Fayad L M, Jin Y, Laine A F, Berkmen Y M, Pearson G D, Freedman B, Van Heertum R V. Chest CT window setting with Multi-scale Adaptive Histogram Equalization: Pilot study. Radiology 2002; 223:845-852.

Jin Y, Fayad L M, Laine A F. Contrast enhancement by multi-scale adaptive histogram equalization. In: Aldroubi A, Laine A F, Unser M A, eds. Wavelet applications and signal and image processing IX. Proc SPIE 2001.

Lehr L, Capek P. Histogram equalization of CT images. Radiology 1985; 154:163-169.

Lerman R, Raicu D S, and Furst J D, "Contrast enhancement of soft tissues in Computed Tomography images", SPIE Medical Imaging, 2006.

Pizer S M, Amburn E P, Austin J D, et al. Adaptive histogram equalizations and its variations. Comput Vision Graph Image Process 1987; 39:355-368.

Pizer S M, Zimmerman J B, Staab E. Adaptive grey level assignment in CT scan display. J Comp Assist Tomogr 1984; 8:300-305.

S. M. Pizer, R. E. Johnston, J. P. Ericksen, B. C. Yankaskas, and K. E. Muller, "Contrast-limited adaptive histogram equalization: speed and effectiveness," presented at Proceedings of the First Conference on Visualization in Biomedical Computing., Atlanta, Ga., USA, 1990.

Spitzer H, Karasik Y and Einav S, "Biological Gain control for High Dynamic Range Compression" Eleventh Color Imaging Conference: Color Science and Engineering Systems, Technologies, Applications Scottsdale, Ariz., p. 42-50; ISBN/ISSN: 0-89208-248-8, Nov. 3, 2003.

J. B. Zimmerman, S. B. Cousins, K. M. Hartzell, M. E. Frisse, and M. G. Kahn, "A psychophysical comparison of two methods for adaptive histogram equalization," Journal of Digital Imaging, vol. 2, pp. 82-91, 1989.

Socolinsky A D. Dynamic range constraints in image fusion and visualization. In Proc. Signal and Image Processing, 2000.

Yu Z and Bajaj C, "A Fast And Adaptive Method For Image Contrast Enhancement," in *Proc. IEEE Int. Conf. on Image Processing*, pp. 1001-1004, 2004.

K. Zuiderveld, "Contrast limited adaptive histogram equalization," in Academic press graphics gems series Graphics Gems IV: Academic Press Professional, Inc. San Diego, Calif., USA, 1994, pp. 474-485

R. Cromartie and S. M. Pizer, "Edge-affected context for adaptive contrast enhancement," in Proceefings of the XIIth international meeting on Information Processing in Medical Imaging: Lecture Notes in Computer Science, A. C. F. Colchester and D. J. Hawkes, Eds.: Spring-Verlag, 1991, pp. 474-485.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of processing a computerized tomography (CT) image, comprising:
    (a) preprocessing the image using contrast enhancement weight function having a local maximum and a local minimum as a function of the CT intensity, thereby providing a preprocessed image having a first dynamic range; and
    (b) applying a companding procedure to said preprocessed image, so as to reduce said first dynamic range;
    thereby processing the image.

2. The method of claim 1, wherein said preprocessing said image comprises, for each picture-element of said computerized tomography image, calculating a selective contribution using said contrast enhancement weight function and adding said selective contribution to an intensity of said picture-element.

3. The method of claim 1, wherein said first dynamic range is reduced to a second dynamic range being displayable on a display device.

4. The method of claim 3, further comprising displaying the processed computerized tomography image on said display device using a single window setting selected in accordance with said second dynamic range.

5. Apparatus for processing a computerized tomography (CT) image, comprising:
    (a) a preprocessing unit configured for preprocessing the image using contrast enhancement weight function having a local maximum and a local minimum as a function of the CT intensity, thereby to provide a preprocessed image having a first dynamic range; and
    (b) companding unit configured for applying a companding procedure to said preprocessed image, so as to reduce said first dynamic range.

6. A computerized tomography system, comprising:
    (a) computerized tomography scanner for scanning a subject using X-ray radiation so as to provide a computerized tomography image; and
    (b) an image processing apparatus comprising the apparatus of claim 5.

7. The apparatus of claim 5, wherein preprocessing unit comprises a selective contribution calculator configured for calculating, for each picture-element of said computerized tomography image, a selective contribution using said contrast enhancement weight function, and wherein said preprocessing unit is configured for adding said selective contribution to an intensity of said picture-element.

8. The apparatus of claim 5, wherein said first dynamic range is reduced to a second dynamic range being displayable on a display device, so as to allow displaying the processed computerized tomography image on said display device using a single window setting selected in accordance with said second dynamic range.

9. The method of claim 2, wherein said selective contribution equals a local weight multiplied by said contrast enhancement weight function.

10. The method of claim 1, wherein said contrast enhancement weight function is characterized by negative values for low intensities and positive values for high intensities.

11. The method of claim 10, wherein said low intensities are characteristic intensities of lung tissue and soft tissue and said high pixel intensities are characteristic intensities of bones.

12. The method of claim 1, wherein said companding procedure comprises, for each picture element of said preprocessed image:
  (i) defining a surrounding region of picture elements and a remote region of picture elements;
  (ii) using intensity levels of each picture element of said surrounding and said remote regions for calculating at least one adaptation term; and
  (iii) assigning a new intensity level to said picture element based on said at least one adaptation term, said new intensity level being in a second dynamic range which is smaller than said first dynamic range.

13. The method of claim 12, wherein said companding procedure further comprises redefining said intensity level using a saturation function.

14. The method of claim 12, wherein said companding procedure further comprises defining a center region for said picture element.

15. The method of claim 14, wherein said at least one adaptation term comprises a local component and a remote component.

16. The method of claim 15, wherein said remote component comprises a selective enhancement function.

17. The method of claim 16, wherein said selective enhancement function is higher for characteristic intensities of lung tissue than for characteristic intensities of liver tissue.

18. The method of claim 16, wherein a rate of change of said selective enhancement function with the intensity is higher for characteristic intensities of soft tissue than for characteristic intensities of liver tissue and lung tissue.

19. The method of claim 16, wherein said selective enhancement function comprises a Bell function.

20. The method of claim 12, wherein said companding procedure comprises a procedure for reducing halo artifacts.

21. The method of claim 15, wherein said remote component is calculated, at least in part, using a contrast-contrast induction model.

22. The method of claim 21, wherein said contrast-contrast induction model comprises a local contrast calculated, at least in part, by integration of intensities over a region which includes said picture-element and said surrounding region, and a remote contrast calculated, at least in part, by integration of said local contrast over said remote region.

23. The method of claim 1, wherein said local maximum is between about 1000 HU and about 1500 HU, and said local minimum is between about 1500 HU and about −1000 HU.

24. The system of claim 5, wherein said local maximum is between about 1000 HU and about 1500 HU, and said local minimum is between about 1500 HU and about −1000 HU.

* * * * *